(12) United States Patent
Harris et al.

(10) Patent No.: US 11,105,938 B2
(45) Date of Patent: Aug. 31, 2021

(54) TIME SIGNATURES AND PATTERN MATCHING IN X-RAY PHOTON COUNTING DETECTORS

(71) Applicant: REDLEN TECHNOLOGIES, INC., Saanichton (CA)

(72) Inventors: Bernard Harris, Vancouver (CA); Krzysztof Iniewski, Coquitlam (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 0 days.

(21) Appl. No.: 16/894,063

(22) Filed: Jun. 5, 2020

(65) Prior Publication Data

US 2020/0393576 A1 Dec. 17, 2020

Related U.S. Application Data

(60) Provisional application No. 62/860,614, filed on Jun. 12, 2019.

(51) Int. Cl.
*G01T 1/24* (2006.01)

(52) U.S. Cl.
CPC .................. *G01T 1/247* (2013.01)

(58) Field of Classification Search
CPC ..................................... G01T 1/247
See application file for complete search history.

(56) References Cited

U.S. PATENT DOCUMENTS

| | | | |
|---|---|---|---|
| 10,393,891 B2 | 8/2019 | Iniewski et al. | |
| 10,396,109 B2 | 8/2019 | Iniewski et al. | |
| 2010/0215230 A1* | 8/2010 | Bornefalk | G06T 11/005 382/128 |
| 2010/0245354 A1* | 9/2010 | Rousso | A61B 6/503 345/424 |
| 2013/0028382 A1* | 1/2013 | Spahn | H04N 5/32 378/62 |
| 2017/0086775 A1* | 3/2017 | Madhav | A61B 6/4035 |
| 2017/0238896 A1* | 8/2017 | Iwai | A61B 6/4241 |
| 2017/0290555 A1 | 10/2017 | Iniewski et al. | |
| 2017/0322319 A1 | 11/2017 | Iniewski et al. | |
| 2018/0177481 A1* | 6/2018 | Jacob | G01N 23/046 |
| 2018/0224564 A1* | 8/2018 | Fu | G01T 1/2928 |
| 2018/0252821 A1* | 9/2018 | Svensson | G01T 1/18 |
| 2019/0204456 A1* | 7/2019 | Persson | G01T 1/247 |

(Continued)

OTHER PUBLICATIONS

U.S. Appl. No. 16/185,963, filed Nov. 9, 2018, Redlen Technologies, Inc.

(Continued)

*Primary Examiner* — Blake C Riddick

(74) *Attorney, Agent, or Firm* — The Marbury Law Group PLLC

(57) ABSTRACT

Various aspects include circuits and methods for use in X-ray detectors for obtaining time information regarding when an indication of an X-ray photon's energy, such as a CSA output voltage, and using the time information to obtain temporal-spectral data regarding an X-ray photon detection. The temporal-spectral data may be used to determine the X-ray photon's energy, to detect and account for multiple X-ray photon detection events ("pile ups"), and/or accommodating detection events in which charge is shared between two pixel detectors.

18 Claims, 19 Drawing Sheets

(56) References Cited

U.S. PATENT DOCUMENTS

| | | | | |
|---|---|---|---|---|
| 2020/0158663 | A1* | 5/2020 | Danielsson | G01T 1/241 |
| 2020/0158895 | A1* | 5/2020 | Danielsson | A61B 6/032 |
| 2020/0209415 | A1* | 7/2020 | Veale | G01T 1/247 |
| 2020/0249364 | A1* | 8/2020 | Cao | G01N 23/223 |
| 2020/0323502 | A1* | 10/2020 | Kojima | A61B 6/4266 |
| 2020/0326437 | A1* | 10/2020 | Steadman Booker | G01T 1/247 |

OTHER PUBLICATIONS

U.S. Appl. No. 16/199,588, filed Nov. 26, 2018, Redlen Technologies, Inc.
U.S. Appl. No. 16/844,484, filed Apr. 9, 2020, Redlen Technologies, Inc.
U.S. Appl. No. 16/875,133, filed May 15, 2020, Redlen Technologies, Inc.

\* cited by examiner

TIME SIGNATURES AND PATTERN MATCHING IN X-RAY PHOTON COUNTING DETECTORS

FIELD

The present application relates generally to radiation detectors for X-ray imaging systems.

BACKGROUND

In typical photon counting X-ray applications currently in use, the charge cloud resulting from an X-ray photon impinging on a sensor is converted to an amplified voltage by a charge sensitive amplifier (CSA). The voltage output of the CSA is compared against a number of user-settable thresholds. Each threshold level is associated with a counter, such that each counter represents an energy bin representing the energy range between two adjacent thresholds.

The lowest threshold is set to slightly above the noise level, and a voltage above this threshold indicates that an X-ray photon has been detected. After the CSA output voltage has stabilized, the counter corresponding to the highest energy bin threshold crossed is incremented, thus recording one detection event in that energy bin. When the count is registered in an energy bin, the CSA is reset, enabling the detector pixel to record another X-ray detection event. However, the time intervals at which various energy bin thresholds are crossed are not utilized in conventional X-ray detectors.

SUMMARY

Various aspects may include X-ray photon detectors and methods of operating such detectors that utilize both temporal and voltage information to obtain information about the temporal shape of the CSA's output waveform, and from such information recognize and account for certain types of detection events. The time at which the thresholds are crossed corresponds to a distinctive pattern, for different energies of the incoming photons. This information can be used for Spectral Estimating to provide a more detailed estimate of the input spectrum, while still using a small number of thresholds. This information may also be used for Pile-up Detection, i.e., indicating whether more than one photon contributed to the input charge pulse. This information may also be used for charge sharing corrections by providing a more accurate estimate of the X-ray photon energy when the charge cloud is distributed over more than one pixel. This information may be used for other applications as well, such as accounting for ballistic deficit.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
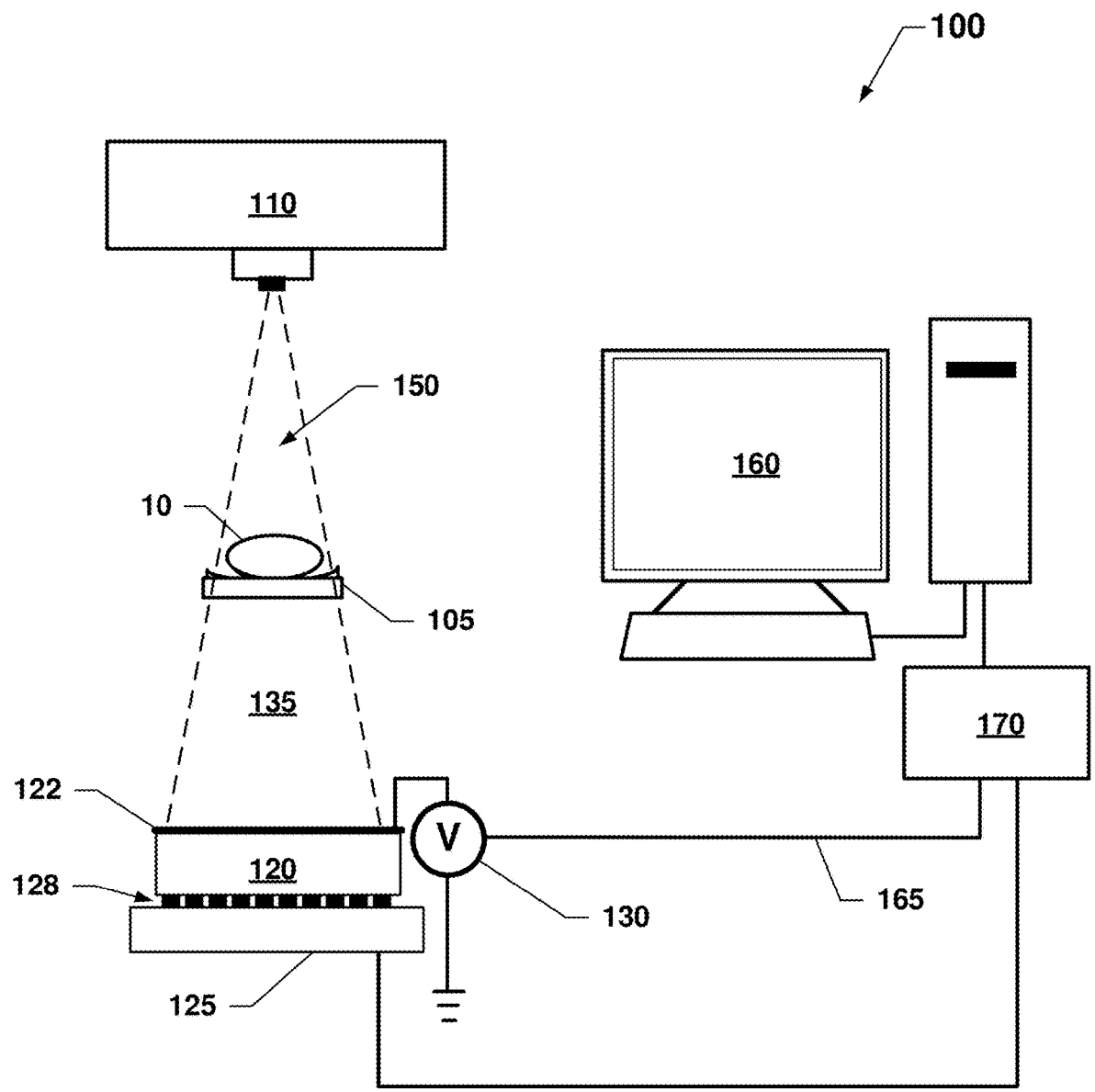
FIG. 1 is a block diagram of an X-ray imaging system suitable for use with various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Various embodiments improve on imaging X-ray detectors by using temporal information about when each of various photon energy indication thresholds are crossed in the brief time it takes for the indication to stabilize after an X-ray photon interaction with the detector material. The indication of photon energy may be the voltage of a CSA output signal, the voltage of the detector pixel anode, or another signal. Obtaining such temporal information may be accomplished in some embodiments by adding one or more timing circuits to the threshold detection and energy bin counter circuits, and using output from the timing circuit(s) to measure any of time intervals between crossings of each energy bin threshold, relative time between crossings of each energy bin threshold, or absolute time from initial detection (crossing of the minimum detection threshold) to each crossing of an energy bin threshold. This temporal information thus correlates photon energy indication (e.g., CSA output voltage or anode voltage) with a time indication (e.g., interval, relative or absolute time indications). Such temporal information then may be used to make determinations about or distinguish various X-ray photon detection events and circumstances resulting from the nature of X-ray photon interactions with detector pixels and the mechanism by which photons are detected and their energies measured by detector pixels. In particular, such temporal information, or patterns in the temporal information, may be used to provide a more detailed estimate of the input spectrum, while still using a small number of thresholds, detect when more than one photon has interacted (absorbed, scattered, etc.) in a detector pixel within a detection window and thus contributed to the CSA output voltage, and/or provide a more accurate estimate of the detected photon energy when the charge cloud is distributed over more than one pixel (referred to herein as charge sharing). Such temporal information may be used for other applications as well, such as accounting for ballistic deficit. Other uses for such temporal information are possible and contemplated as part of this disclosure.

FIG. 1 is a functional block diagram of an example ionizing radiation imaging system in accordance with various embodiments. The illustrated example ionizing radiation, is a CT imaging system 100 that includes an X-ray source 110 (i.e., a source of ionizing radiation), and a radiation detector 120. The CT imaging system 100 may additionally include a support structure 105, such as a table or frame, which may rest on the floor and may support an object 10 to be scanned. The support structure 105 may be stationary (i.e., non-moving) or may be configured to move relative to other elements of the CT imaging system 100. The object 10 may be all or a portion of any biological (e.g., human patient) or non-biological (e.g., luggage) object to be scanned.

The X-ray source 110 is configured to deliver ionizing radiation to the radiation detector 120 by emitting an X-ray beam 135 toward the object 10 and the radiation detector 120. After the X-ray beam 135 is attenuated by the object 10, the beam of radiation 135 is received by the radiation detector 120.

The radiation detector 120 may be controlled by a high voltage bias power supply 130 that selectively creates an electric field between an anode 122 and cathode 128 pair coupled thereto. The radiation detector 120 may include CdZnTe material disposed between the anode 122 and cathode 128 and thus configured to be exposed to the electrical field therebetween. A read-out application specific integrated circuit (ASIC) 125 coupled to the anode 122 and cathode 128 pair may receive signals (e.g., charge or current) from the anode 122 and be configured to provide data to and by controlled by a control unit 170.

The control unit 170 may be configured to synchronize the X-ray source 110, the read-out ASIC 125, and the high voltage bias power supply 130. The control unit 170 may be coupled to and operated from a computing device 160. Alternatively, the computing device 160 and the control unit 170 may be integrated together as one device.

The object 10 may pass between the X-ray source 110 and the radiation detector 120 or alternatively the object may remain stationary while the X-ray source 110 and the radiation detector 120 move relative to the object 10. Either way, the radiation detector 120 may capture incremental cross-sectional profiles of the object 10. The data acquired by the radiation detector 120 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure supporting the radiation detector 120 and a stationary support part of the support structure 105, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form two-dimensional images of cross-sectional slices of the object 10.

Various alternatives to the design of the CT imaging system 100 of FIG. 1 may be employed to practice embodiments of the present disclosure. CT imaging systems may be designed in various architectures and configurations. For example, a CT imaging system may have a helical architecture. In a helical CT imaging scanner, the X-ray source and detector array are attached to a freely rotating gantry. During a scan, a table moves the object smoothly through the scanner creating helical path traced out by the X-ray beam. Slip rings enable the transfer of power and data on and off the rotating gantry. In other embodiments, the CT imaging system may be a tomosynthesis CT imaging system. In a tomosynthesis CT scanner, the gantry may move in a limited rotation angle (e.g., between 15 degrees and 60 degrees) in order to detect a cross-sectional slice of the object. The tomosynthesis CT scanner may be able to acquire slices at different depths and with different thicknesses that may be constructed via image processing.

The detector array of a CT imaging system may include an array of radiation detector elements, referred to herein as pixel detectors. The signals from the pixel detectors may be processed by a pixel detector circuit, which may sort detected photons into energy bins based on the energy of each photon or the voltage generated by the received photon. When an X-ray photon is detected, its energy is determined and the X-ray photon count for its associated energy bin is incremented. For example, if the detected energy of an X-ray photon is 24 kilo-electron-volts (keV), the X-ray photon count for the energy bin of 20-40 keV may be incremented. The number of energy bins may range from one to several, such as two to six. In an illustrative example, an X-ray photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 80 keV, and a fourth bin for detecting photons having an energy above 80 keV. The greater the total number of energy bins, the better the material discrimination.

In CT imaging systems, a scanned object is exposed to an X-ray beam and attenuated photons from the X-ray beam are detected and counted by individual radiation detector pixels in a detector array. When an object (e.g., the object 10) is loaded in a CT imaging system, the X-ray beam may be heavily attenuated, and the number of photons detected by the detector array may be orders of magnitude less than the number of photons emitted from an X-ray source. For image reconstruction purposes, the radiation detector can be exposed to a direct X-ray beam without an intervening object located inside the CT imaging system. In such cases, the X-ray photon count rates in the CT imaging system may reach values of 100 million counts per second per square millimeter (Mcps/mm$^2$) or more. The detector array may be capable of detecting such a wide range of photon count rates.

It should be noted that various embodiments of imaging radiation detectors and methods of processing signals from such detectors, may be used in other types of ionizing radiation imaging systems, such as Single Photon Emission Computed Tomography (SPECT) imaging systems, stationary X-ray imaging systems, non-destructive testing and inspection imaging systems, etc.

Figure 2:
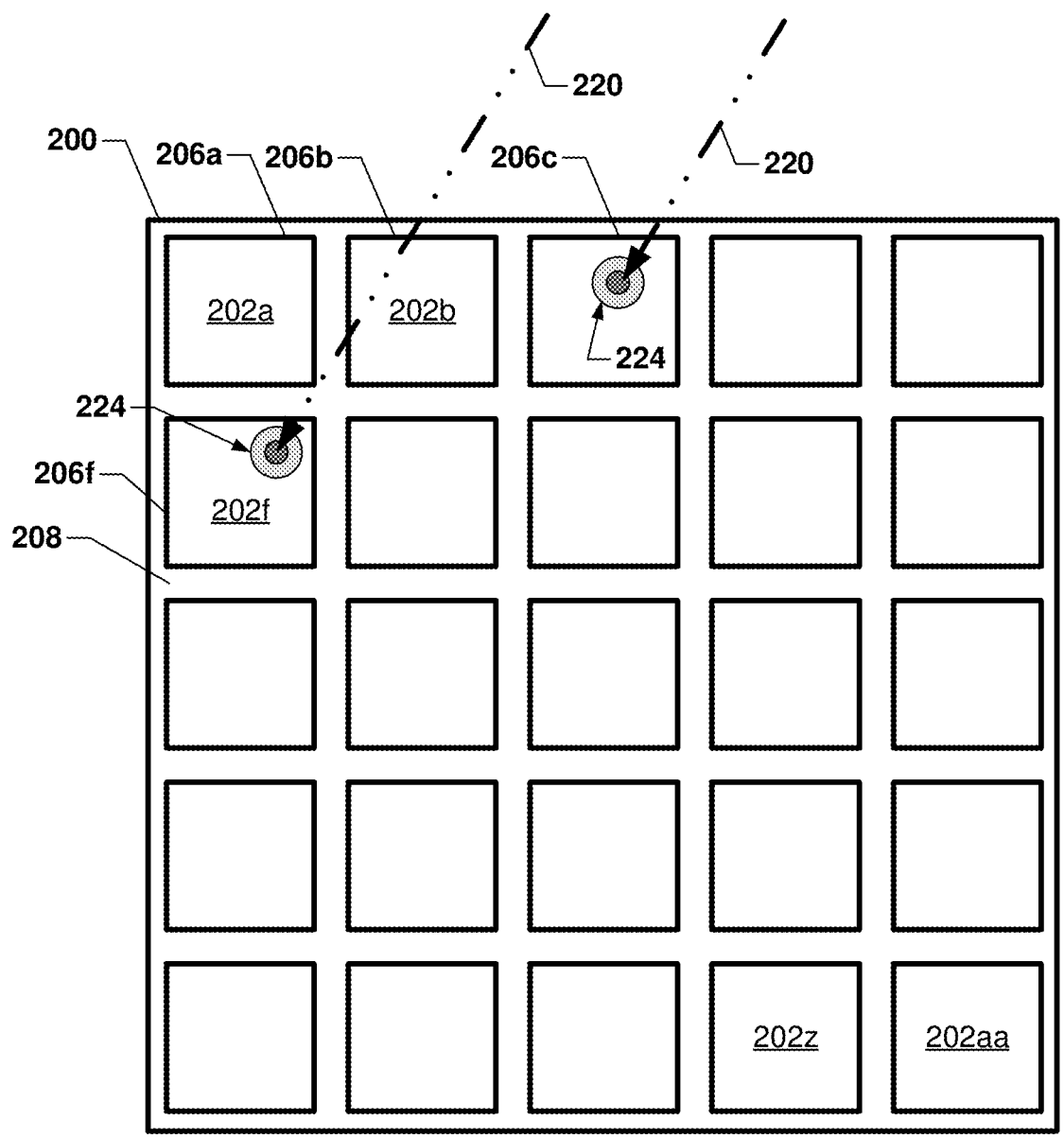
FIG. 2 is a conceptual top view diagram of a semiconductor pixel radiation detector illustrating X-ray interactions.

FIG. 2 is a top view of a portion of a pixelated radiation detector array 200 showing the plurality of pixels 202a-202aa formed by the anodes 206a, 206b positioned on the CZT semiconductor crystal 208. As described above, when an X-ray 220 interacts with atoms within the CZT semiconductor crystal 208, the cloud of ejected electrons 224 are gathered on the nearby anode 206c, 206f and recorded as a count. Further, the number of electrons 224 (i.e., charge) collected on the anode 206c, 206f is reflective of the energy of the incoming photon, and thus a measurement of the energy (or spectrum) of the detected photon can be determined from the charge or current detected on the anodes.

Figure 3A:
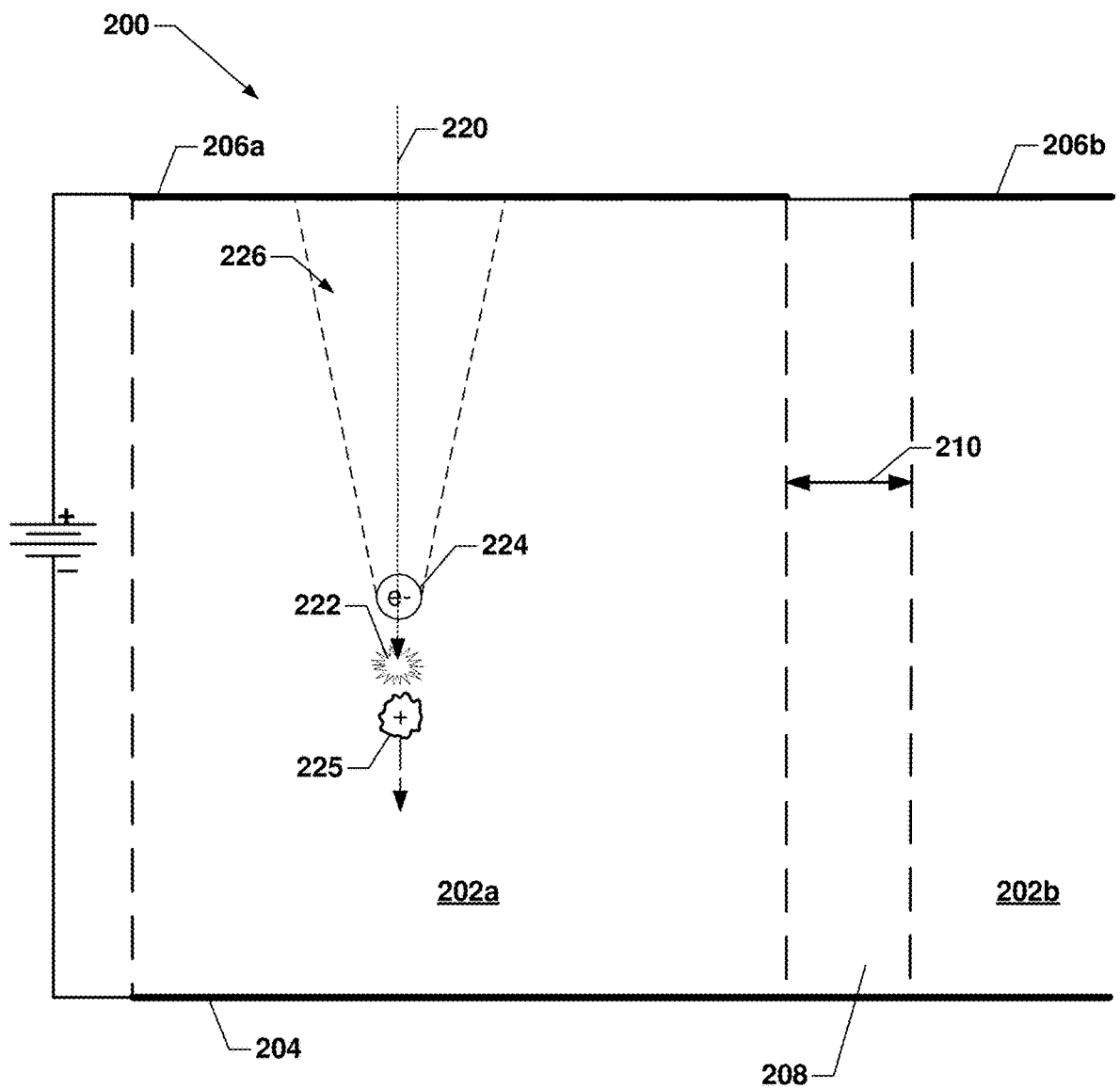
FIG. 3A is a conceptual cross section view diagram of a semiconductor pixel radiation detector illustrating an X-ray absorption and mechanisms for detecting and measuring the energy of the detected X-ray.

As an X-ray photon enters the CZT sensor volume of a detector and interacts with the atoms constituting that sensor it will deposit some, or all, of its energy. FIG. 3A illustrates a cross-sectional view of two pixels 202a, 202b within a CZT radiation detector array 200. Such a detector 200 may include a sheet of CZT semiconductor crystal 208 on which are applied to a cathode 204 and the anodes 206a, 206b that define each pixel 202a, 202b. The anodes 206a, 206b may be spaced apart by an inter-pixel gap 210. In typical radiation detector arrays 200, the thickness of the CZT semiconductor crystal 208 may range from 1 mm to 20 mm, the anodes 206a, 206b may have a side dimension of 0.1 mm to 3 mm, and the inter-pixel gap 210 may range from 0.01 mm to 0.5 mm.

When an X-ray 220 is absorbed via a photoelectric effect event 222 by an electron of an atom within the CZT semiconductor crystal 208, the energy of the X-ray photon is transferred to an ejected electron (not shown) that quickly slows down by ionizing nearby atoms thus generating a cloud of electrons 224 ejected into the conduction band of the semiconductor along the path of travel. The range of a photoelectron in CZT depends on the energy carried off by that electron. Each ejected electron creates a corresponding hole 225 of positive charge. The clouds of electrons (and holes) generated by a photoelectron are not uniform in charge density, because electron—hole production increases towards the end of the track of the photoelectron. A voltage is applied between the cathode 224 and anodes 206a, 206b causes the electrons 224 to drift to the anode 206a where they are collected as a signal as described above. Holes 225 similarly migrate towards the cathode 204. Diffusion and charge repulsion forces cause the electron cloud to expand (as shown at 226) by the time the electrons reached the anode 206a.

The term "cloud" is used to highlight the fact that the physical size of the electron charge is not a point but approximately a sphere with a certain radius. Each X-ray photon absorbed in the CZT detector generates several thousands of electrons, so even the initial charge has finite physical dimensions. The number of generated electrons can be estimated by dividing the incoming photon energy by the CZT ionization energy of 4.64 eV. For example, an X ray photon with an energy of 140 keV will produce about 30,000 electrons in the conduction zone, collectively carrying a charge of approximately 4.8 femto coulombs (fC).

As the detector needs to accommodate the time required for the charge cloud 226 to migrate to the anode 206a, a detector may be configured with a timer that controls when the charge on the anode should be registered as a signal indicative of the energy of the detected photon. In a typical detector, a threshold circuit coupled to each anode 206 may start such a timer when the charge on the anode exceeds a certain minimum threshold. The timer may then run for a brief period of time, referred to as a "dead time" time, during which the electron cloud produced by the photon interaction moves toward the anode and charge is induced on the anode before the amount of charge is read by a CSA. In a high flux application, such as any of a number of X-ray imaging systems (e.g., a CT scanner), there is a significant probability that a second photon may be absorbed in the detector pixel during the dead time resulting in a pile up detection event.

Figure 3B:
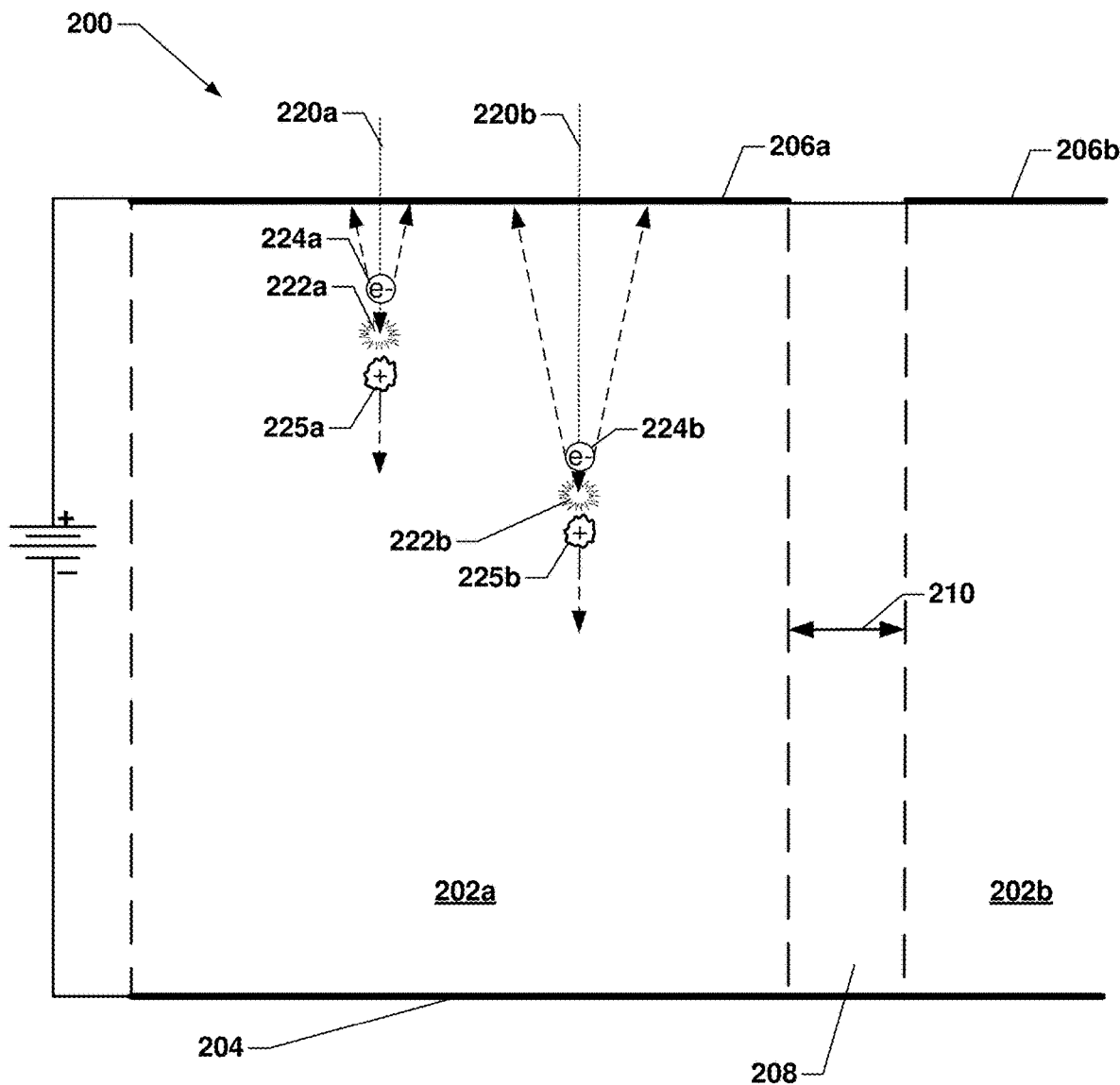
FIG. 3B is a conceptual cross section view diagram of a semiconductor pixel radiation detector illustrating an X-ray "pile up" absorption event.

An example of a pile up detection event is illustrated in FIG. 3B. In this example, a first X-ray photon 220a is absorbed in a first photoelectric event 222a, resulting in a first electron cloud 224a that migrates toward the anode 206a and a first hole cloud 225a that migrates toward the cathode 204. Before the end of the dead time, a second X-ray photon 220b is absorbed in a second photoelectric event 222b, resulting in a second electron cloud 224b that migrates toward the anode 206a and a second hole cloud 225a that migrates toward the cathode 204. Thus, by the end of the dead time, the total charge accumulated by the pixel anode 206a will be that of the first electron cloud 224a and at least a portion of the second electron cloud 224b, resulting in a greater charge read by the CSA, and thus a higher energy output signal by the CSA than the energy of either incoming photon 220a, 220b. Thus, if treated as a single detection event, the resulting detection will be of one photon instead of two and of an energy greater than either incident photon.

Figure 3C:
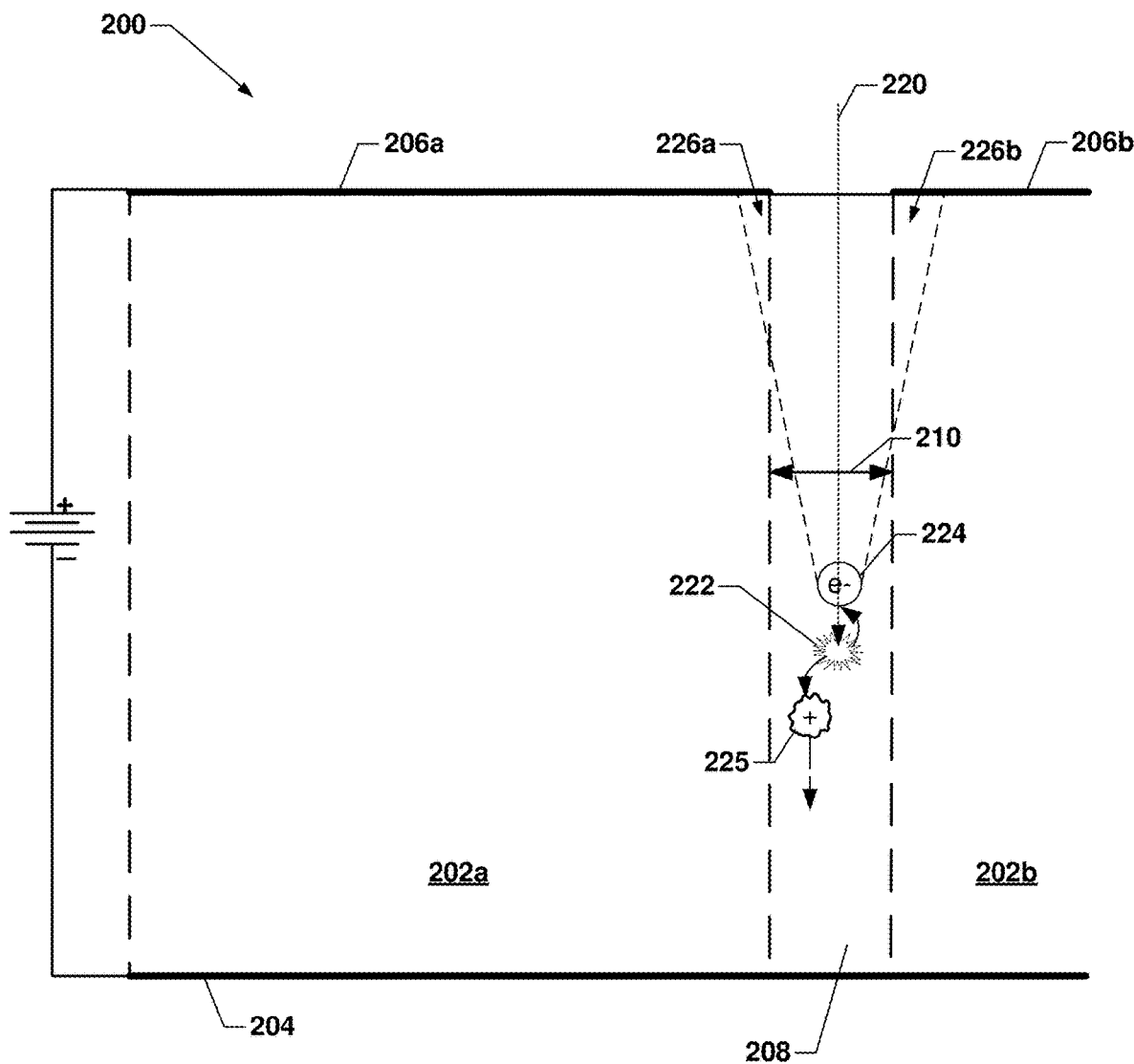
FIG. 3C is a conceptual cross section view diagram of a semiconductor pixel radiation detector illustrating an X-ray absorption occurring between adjacent detector pixels and the effect of measuring the energy of the detected X-ray between adjacent pixels.

Because the energy of an incident photon 220 is reflected in the number of electrons in the cloud that are collected by the anodes 206a, 206b, the location of detection events and the measured energy of such events depends upon the location in the detector where energy is deposited from various photon-matter interactions. For example, as illustrated in FIG. 3C, an X ray photon 220 entering the detector 200 near the boundary of a detector pixel or within the inter-pixel gap 210 and undergoing a photoelectric absorption interaction 222 will result in a cloud of electrons 224 (and holes 225) that will be motivated by the electric field generated by the neighboring anodes 206a, 206b. As the electron cloud 224 drifts towards the anodes 206a, 206b, expanding due to mutual repulsion, a portion 226a of the electrons will be collected by one anode 206a and a portion 226b of the electrons will be collected by the neighboring anode 206b. Also, some electrons in the cloud 224 may interact with surface effects within the gap 210 between anodes 206a, 206b, and not be collected by either anode. Thus, an X ray photon 220 entering the detector 200 near the boundary of a detector pixel or within the inter-pixel gap 210 will result in signals in two detector pixels 202a, 202b, with each measured signal being a fraction of the total charge (i.e., electron cloud 224) created by the photoelectric effect interaction 222. Such an event is referred to herein as a charge sharing detection event.

While conventional X-ray detectors only record the total electron cloud reaching a detector anode, the temporal nature of the charge build up on the anode from the electron cloud can be used to distinguish pile up events, as shown in FIG. 3B, as such events exhibit a distinctive temporal spectral pattern. Further, the temporal spectral pattern can be used to estimate an X-ray photon's energy, as the pattern may be distinctive for different photon energies. Also, the energy-dependent temporal-spectral pattern can be used to estimate photon energies in charge sharing detection events. Also, the energy-dependent temporal-spectral pattern may be used for other applications, such as accounting for ballistic deficit. Thus, the temporal-spectral pattern of charge accumulation that is distinctive for different photon energies can be used to identify different interaction situations and distinguish photon energies when the CSA output signal is not reflective of the actual photon energy or energies. Only a small number of patterns are expected for a single-photon event. Thus, the temporal-spectral pattern of charge collected on a pixel anode can be compared against calibrated temporal-spectral patterns to estimate the energy of an incoming photon, possible with considerably higher resolution than by only considering the highest threshold crossed at the end of the dead time. Analysis of the temporal-spectral signature within a detected signal may be accomplished using digital circuits, which may be smaller and lower power than conventional analog circuits used in conventional X-ray detectors.

Figure 4:
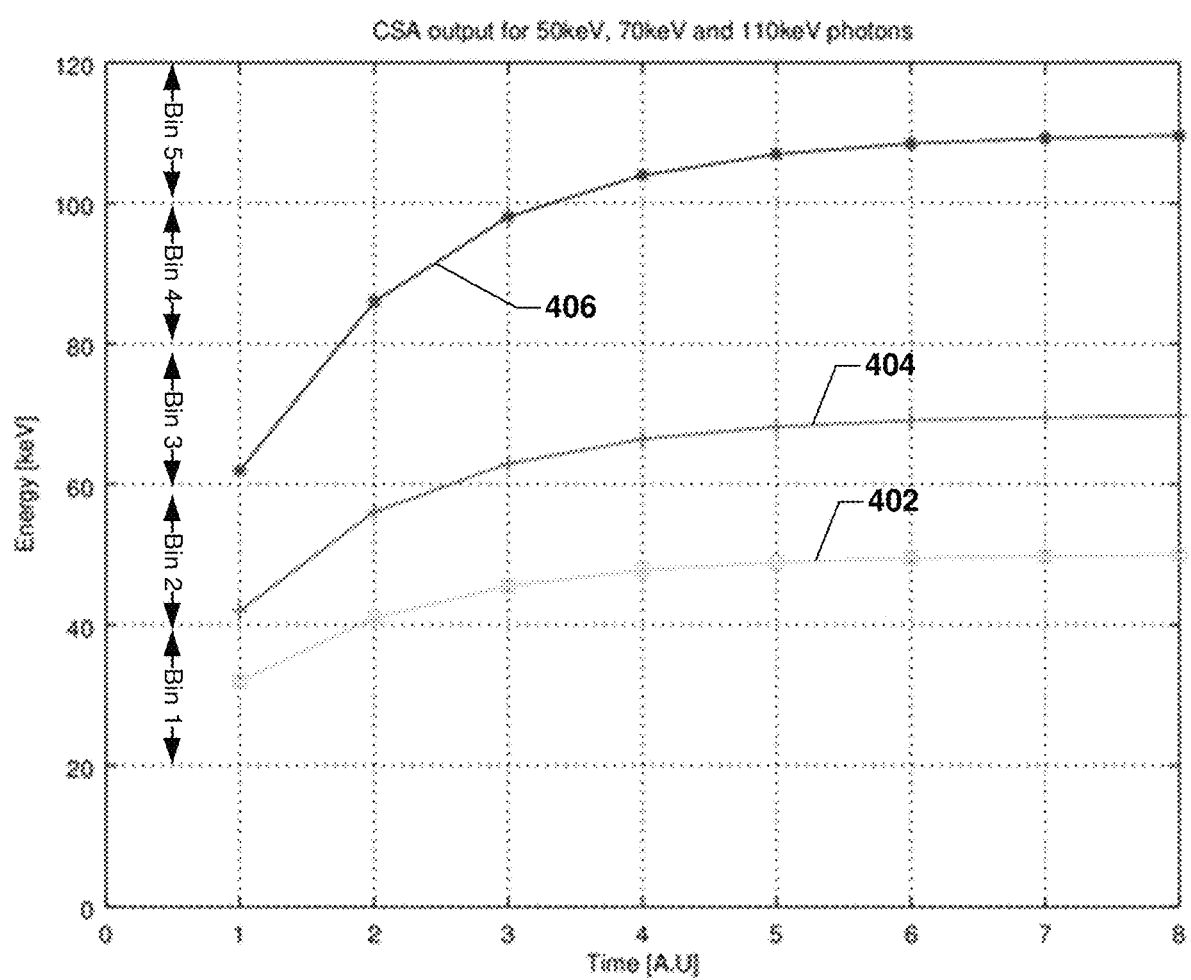
FIG. 4 graph of the detected signals of X-rays of three different energies as detected individually.

As an example, FIG. 4 illustrates a possible CSA output signals for single event detections of photons of 50 keV (line 402), 70 keV (line 404), and 110 keV (line 406) energy, in a detector with six photon energy bin thresholds at 20, 40, 60, 80, 100 and 120 keV.

FIG. 4 illustrates that as photon energy increases, the initial rate of charge accumulation on the anode increases. When plotted against time (i.e., as a temporal-spectral pattern) the slope of charge vs. time and the time for the entire charge cloud to reach the anode provides a recognizable pattern, sometimes referred to herein as a "waveform," which is characteristic of the photon energy, photon interactions, and the CSA and filter. Further, the temporal-spectral pattern can be observed by noting the time when each photon energy bin threshold is crossed or the time between threshold crossings. For example, the CSA output signal in the event of a 50 keV photon detection crosses the minimum detection threshold at about 30 keV in (bin1) in a first arbitrary unit (AU) of time, and takes a duration of 1 more time unit to cross the 40 keV threshold of bin 2. As the X-ray photon had less than the 60 keV of the next (i.e., bin 2) energy threshold, seven time units pass after the 40 keV (bin 1) threshold was crossed before the end of the dead time, and no higher energy bins. Thus, the temporal spectral signature pattern of a 50 keV photon recorded in a detector having 6 energy bins and eight time units within the dead time can be reflected in a vector value such as [1, 7, -, -, -, -].

As another example, the CSA output signal for a 70 keV photon detection crosses the minimum detection threshold above the 40 keV threshold of bin 2 so this detection exhibits a duration of 0 time units between 20 and 40 keV (i.e., exhibiting 0 time units in bin 1), and takes 2 time units before crossing the 60 keV energy threshold of bin 2. As the X-ray photon had less than the 80 keV of the next (i.e., bin 3) energy threshold, six time units pass after the 60 keV (bin 2) threshold was crossed before the end of the dead time, and no higher energy bins. Thus, the temporal spectral signature pattern of a 700 keV photon recorded in a detector having six energy bins and eight time units within the dead time can be reflected in a vector value such as [0, 2, 6, -, -, -].

As another example, the CSA output signal for a 110 keV photon detection crosses the minimum detection threshold above the 60 keV threshold of bin 3 so this detection exhibits a duration of 0 time units between 20 and 40 keV (bin 1), 0 time units between 40 and 60 keV (bin 2), and 1 time unit between 60 and 80 keV (bin 3). Further, the CSA output signal crosses the 100 keV threshold of bin 4 in two or more time units (thus the signal is between 80 keV and 100 keV of energy bin 4 for two time units). As the X-ray photon had less energy than the next energy bin threshold of 120 keV, five time units pass before the end of the dead time ((thus the signal is between 100 and 120 keV of bin 5 for five time units), and no further energy bin thresholds are crossed. Thus, the temporal spectral signature pattern of a 700 keV photon recorded in a detector having 6 energy bins and eight time units within the dead time can be reflected in a vector value such as [0, 0, 1, 2, 5, -].

Thus, the temporal-spectral information that may be obtained according to various embodiments provides a method for determining or estimating an X-ray photon's energy based upon its temporal-spectral pattern.

In some embodiments, the temporal information may be used to detect when multiple photon interactions occur near simultaneously such that their combined charge clouds contribute to the indication of the measured indication of photon energy, such as the CSA output voltage. Such events are referred to herein as "pileups" and will result in recording one photon with an energy equal to or greater than that of the first photon and up to the sum of the two (or more) photons.

If more than one photon arrives during the dead time, the indication of photon energy such as the output signal of the CSA will integrate charge from both the first photon and at least a fraction of the charge from the second photon, depending on when the second photon arrives. The indication of photon energy such as the output of the CSA will thus be the sum of the two energies and, if not accounted for, only a single event will be recognized and counted for an X-ray photon having an energy equal to the sum of the two photon energies. As an example, a detection event in which a 50 keV photon absorption event is quickly followed by a 60 keV photon absorption event could appear as a single 90 kev photon detection because the indication of photon energy such as the voltage of the CSA output signal is the same at the end of the dead-time (i.e., when a count is recorded and the CSA reset) in either situation. A detection event based on two or more photon absorptions within the dead-time is referred to as "pileup". It is advantageous to detect when pileup has occurred and preferably to estimate the energies of the two photons.

Some embodiments detect when a pileup has occurred by leveraging the fact that the temporal-spectral waveform from a single photon is different from that of two photons interacting with the detector in a pileup event. Thus, even if the indication of photon energy such as the voltage of the CSA output signal is the same at the end of the dead-time (i.e., when a count is recorded and the CSA reset) in either event, the two types of detection events can be distinguished based on their different timing patterns of when the indication of photon energy such as the CSA output signal crosses the various energy bin thresholds (i.e., their temporal-spectral waveforms).

Figure 5:
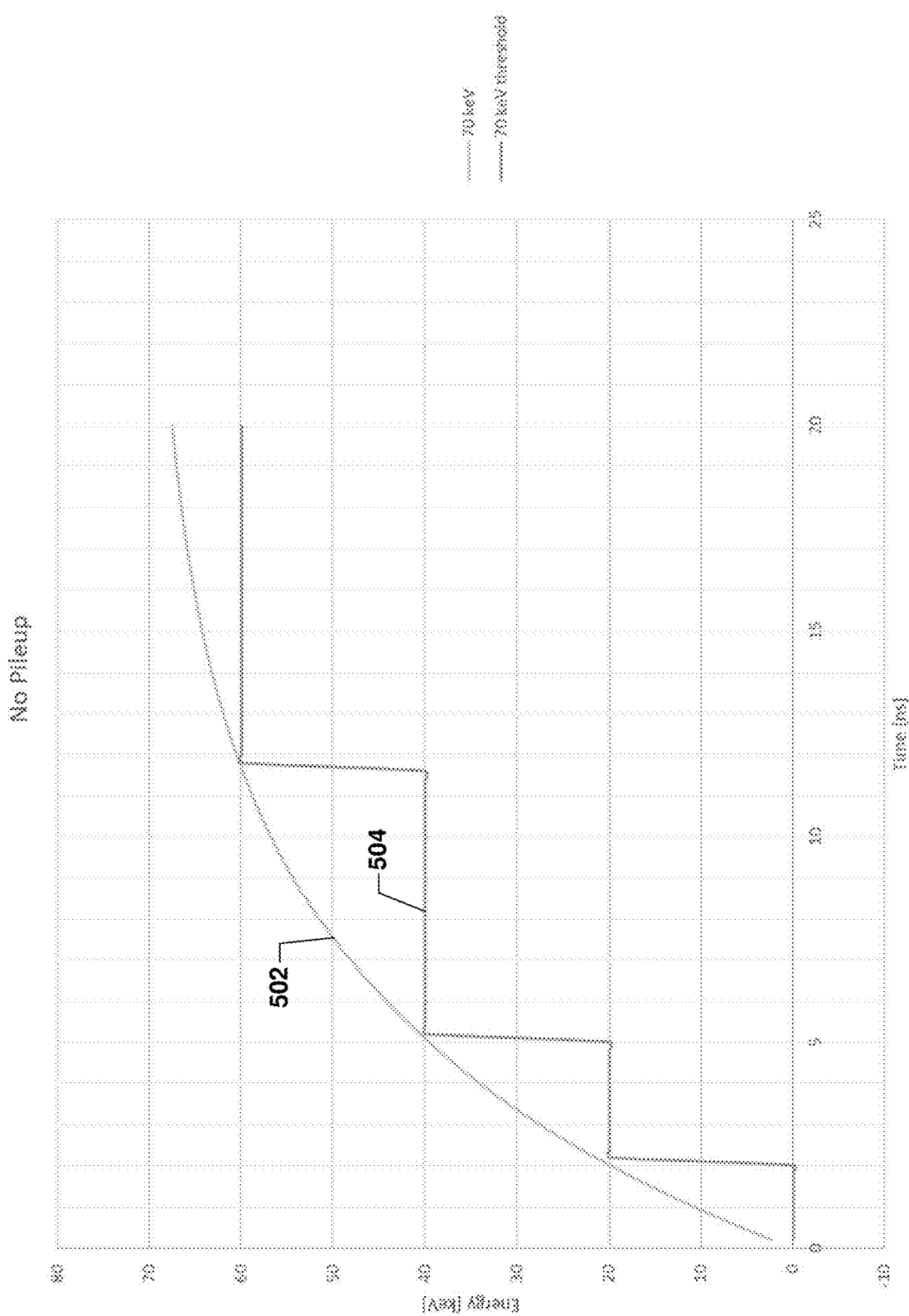
FIG. 5 is a graph illustrating how two X-ray absorption events occurring near simultaneously in a "pile up" event may result in the same output signal as a single more energetic X-ray absorption event.

FIG. 5 illustrates in the stair-step line 504 how the smooth temporal-spectral curve 502 of how the charge cloud would be collected on the anode would be reflected in energy bin levels versus time. The time scale in FIG. 5, which is in milliseconds, is arbitrary and other time units may apply.

Figure 6:
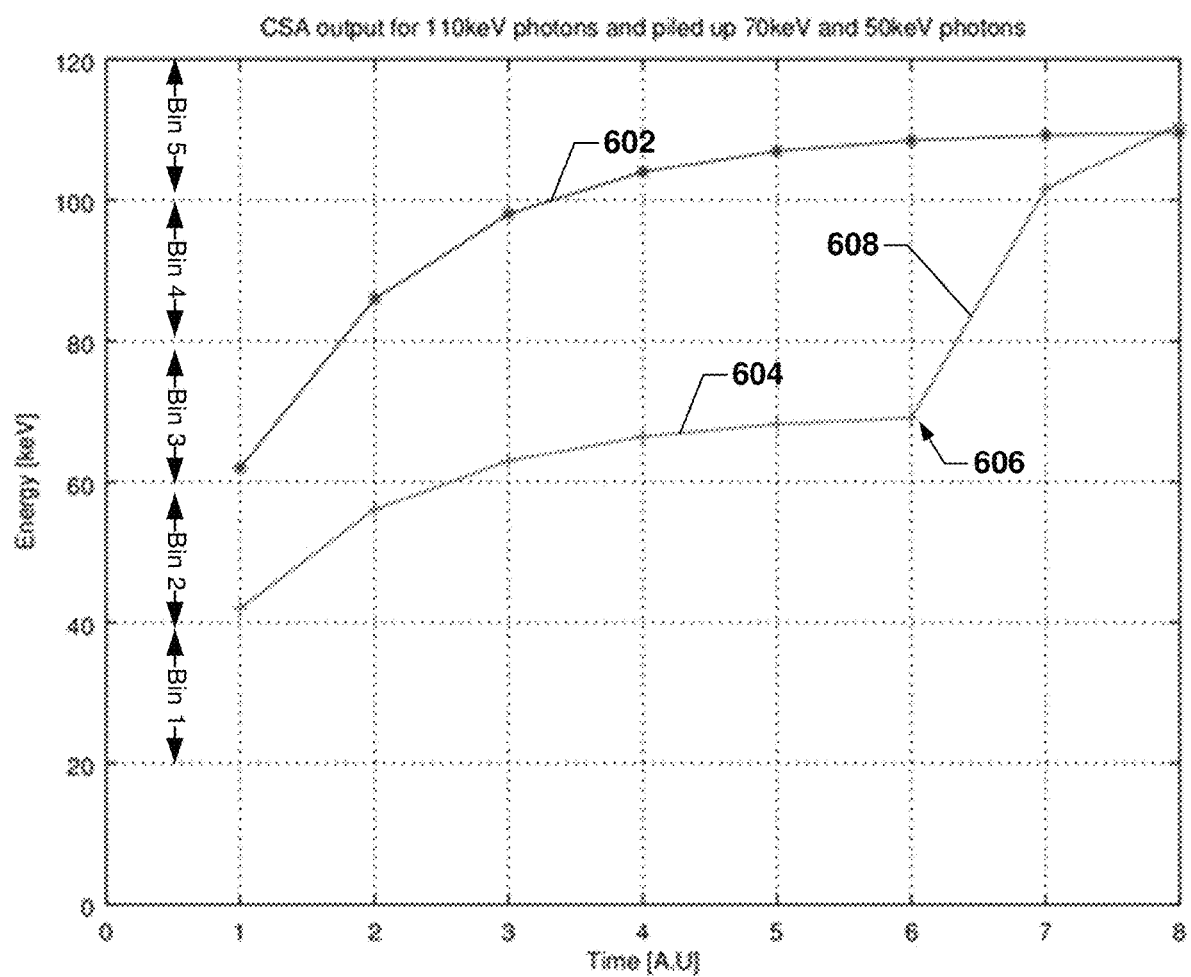
FIG. 6 is a graph illustrating time characteristics of a single X-ray absorption output signal as detected in a detector with discrete energy bin thresholds.

In contrast to the characteristic single photon interaction temporal-spectral patterns illustrated in FIGS. 4 and 5, a pile up detection event exhibits a very different temporal-spectral patterns as illustrated in FIG. 6. The illustrated example shows how the CSA output signal from a single 110 keV photon and a pileup of a 50 keV and a 70 keV photon could have the same final energy value. However, in a detector in which energy thresholds for six energy bins are set at 20 keV, 40 keV, 60 keV, 80 keV, 100 keV and 120 keV, for example, the patterns corresponding to the two situations are very different.

In the example illustrated in FIG. 6, a single 110 keV photon could result in a CSA output signal (line 602) in which by the first arbitrary time interval since the threshold detection the third 60 keV will have been reached, by the second time interval the 80 keV threshold will have been crossed, by the fourth time interval the 100 keV threshold will be crossed, but the 120 keV threshold will not be crossed as the CSA output signal stabilizes at 110 keV. Thus, no time intervals pass while the CSA output signal is greater than 20 keV but less than 40 keV, and no time intervals pass while the CSA output signal is greater than 40 keV but less than 60 keV. Also, two time intervals pass after the 80 keV threshold is crossed before the 100 keV threshold is crossed, and five time intervals pass after the 100 keV threshold is crossed before the count is recorded and the CSA reset after the eighth time interval. These results may be reflected in a vector form, such as stored in an eight-element memory register as [0, 0, 1, 2, 5, -]. With 6 energy bins and eight time intervals between initial detection and CSA reset at the end of the dead time, this vector representation of the time-spectral vector could be represented in an 18 bit register (i.e., six three-bit elements).

In the illustrated example of a pile up of a 70 keV photon followed by a 50 keV photon interacting within eight time intervals of initial detection, absorption of the 70 keV photon would result a CSA output signal (line 604, 608) in which by the first arbitrary time interval since the threshold detection the 40 keV will have been reached, by the third time interval the 60 keV threshold will have been crossed, but that photon will not result in the further thresholds being crossed as the X-ray photon energy is less than the next (i.e., 80 keV) threshold. However, before the CSA reset occurs at the end of the dead time, for example around the sixth time interval since the minimum threshold was exceeded, a 50 keV photon interacts with the detector pixel at 606, resulting in the 100 keV threshold being crossed by the seventh time interval (line segment 608) without the 120 keV threshold being crossed before the CSR reset after the eighth threshold. Thus, no time intervals pass while the CSA output signal is greater than 20 keV but less than 40 keV, four time intervals pass while the CSA output signal is greater than 40 keV but less than 60 keV, no time intervals pass while the CSA output signal is greater than 60 keV but less than 80 keV, and two time intervals pass after the 100 keV threshold is crossed before the count is recorded and the CSA reset after the eighth time interval. These results may be reflected in a vector form, such as in a six-element register as [0, 2, 4, 0, 2, -].

Figure 7:
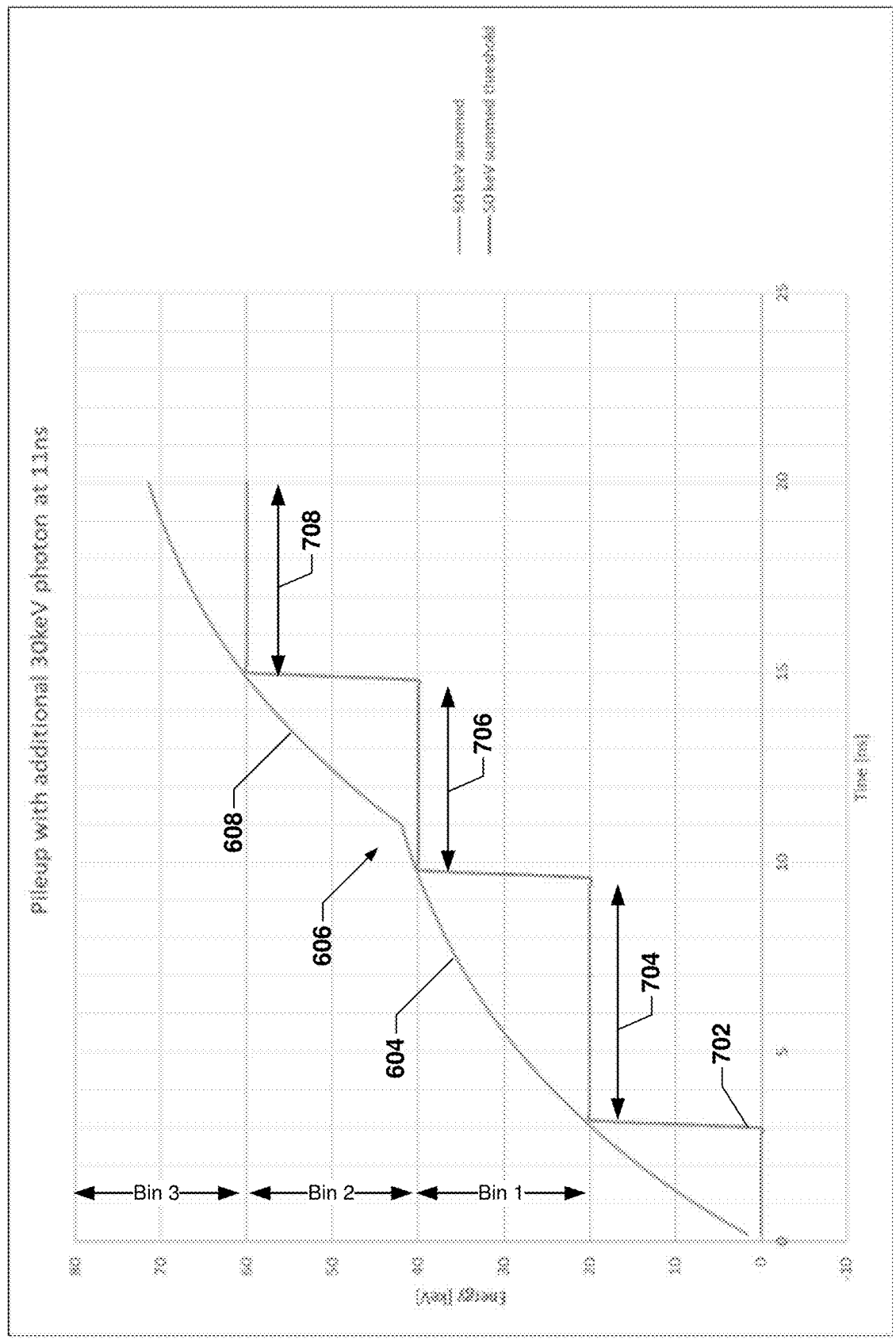
FIG. 7 is a graph illustrating time characteristics of an X-ray absorption output signal in the event of a two-photon pile up event as detected in a detector with discrete energy bin thresholds.

Another observation from FIG. 6 and FIG. 7 is that for a typical CSA output signal of a single photon detection, the temporal-spectral waveform is convex, with the time duration in each successive energy bin (i.e., time interval between energy bin threshold crossings) is either greater than or equal to the preceding one (except for the final bin in some cases). In contrast, in the pileup situation, there is an inflection (at 606) in the temporal-spectral waveform, such that the waveform is no longer convex, and the time duration in each successive energy bin (i.e., time intervals 704, 706, 708 between energy bin threshold crossings shown as vertical segments of the stairstep line 702) in a given later bin may be less than in the preceding bin. Thus, a pattern in which the duration 704, 706, 708 in each successive energy bin (or time intervals between energy bin threshold crossings) do not increase across the vector can be used to detect that a pileup detection event has occurred, with the position in the vector (i.e., time interval increment 706) where the inflection occurs indicating when the second photon arrived.

In some embodiments, a pileup detection method, which can be implemented in a simple comparator circuit (not shown), the values (e.g., time units or durations) in each element of the incoming-pattern register may be subtracted from the next element incrementally to detect a pile up event. If the result of any of the subtractions is negative and is not the last element (i.e., not a time interval count for the highest energy bin threshold), the event may be flagged as a pileup event, and treated accordingly in the detector signal processor.

This ability to use temporal information or a temporal-spectral waveform to detect that a pileup event has occurred may also be used to estimate the energies of the constituent photon detections, and to increment the appropriate energy bins corresponding to the two photons instead of either ignoring the event (thus reducing efficiency) or incrementing the energy bin matching the combined energies (thus introducing an erroneous count).

In some embodiments, the temporal-spectral waveform may be analyzed to detect an inflection point 606 in the pattern at which the time durations in each successive energy bin (i.e., time interval between energy bin threshold crossings) in the waveform are no longer increasing. At that point, the waveform may be divided into two parts, one part prior to the inflection point (line 604) and one part after the inflection point (line 608). The first part of the temporal-spectral waveform 604 is the same for a set of photons within a range of energies, even though the energy is not as clearly defined as when the full single-event waveform or pattern is available. All of the energy bins for which respective thresholds were crossed within the first part of the temporal-spectral waveform may be treated as associated with a first photon. As photons of similar energies will result in a similar temporal-spectral waveform, the first portion 604 of a measured temporal-spectral waveform (i.e., durations between energy bin threshold crossing before the inflection point 606) may be used to estimate the energy of the first photon (i.e., the X-ray photon that resulted in the first part of the measured temporal-spectral waveform). For example, the first portion 604 of the temporal-spectral waveform in FIG. 6 has a shape (e.g., reflected in the energy bin/time vector) as the 70 keV single photon temporal-spectral waveform shown in FIG. 4. To account for the fact that the full CSA output signal may not have been received before the second photon interaction, the first part of the temporal-spectral waveform may be incremented by a fraction, with all of such fractions being less than 1, and the sum of the fractions totaling to 1, and the distribution of the incrementing fractions according to the likelihood of the first part of the temporal-spectral waveform matching a particular energy bin.

Similar pattern matching of the temporal-spectral waveform may also be done for the second part of the measured waveform (line 608). To do so, an estimate of the first photon's energy is made based on the first part of the temporal-spectral waveform as just described. Then the second part of the temporal-spectral waveform (i.e., the portion of the waveform starting from the inflection point) may be adjusted by shifting the time durations to lower bins, essentially subtracting the estimated energy of the first photon from that of the second part of the temporal-spectral waveform. The adjusted second part of the temporal-spectral waveform can then be used to estimate the energy of the second photon, with the appropriate range of energy bins incremented by fractions as described above for the first photon.

It should be noted that the temporal-spectral waveform may be convex, concave or even non-monotonic in some embodiments and some interaction situation. However, in all cases an inflection in the temporal-spectral waveform may be used to flag that was a detect event different from a single photon interaction, and arithmetic operations on the vector used for detection and for correction may be triggered.

Figure 8:
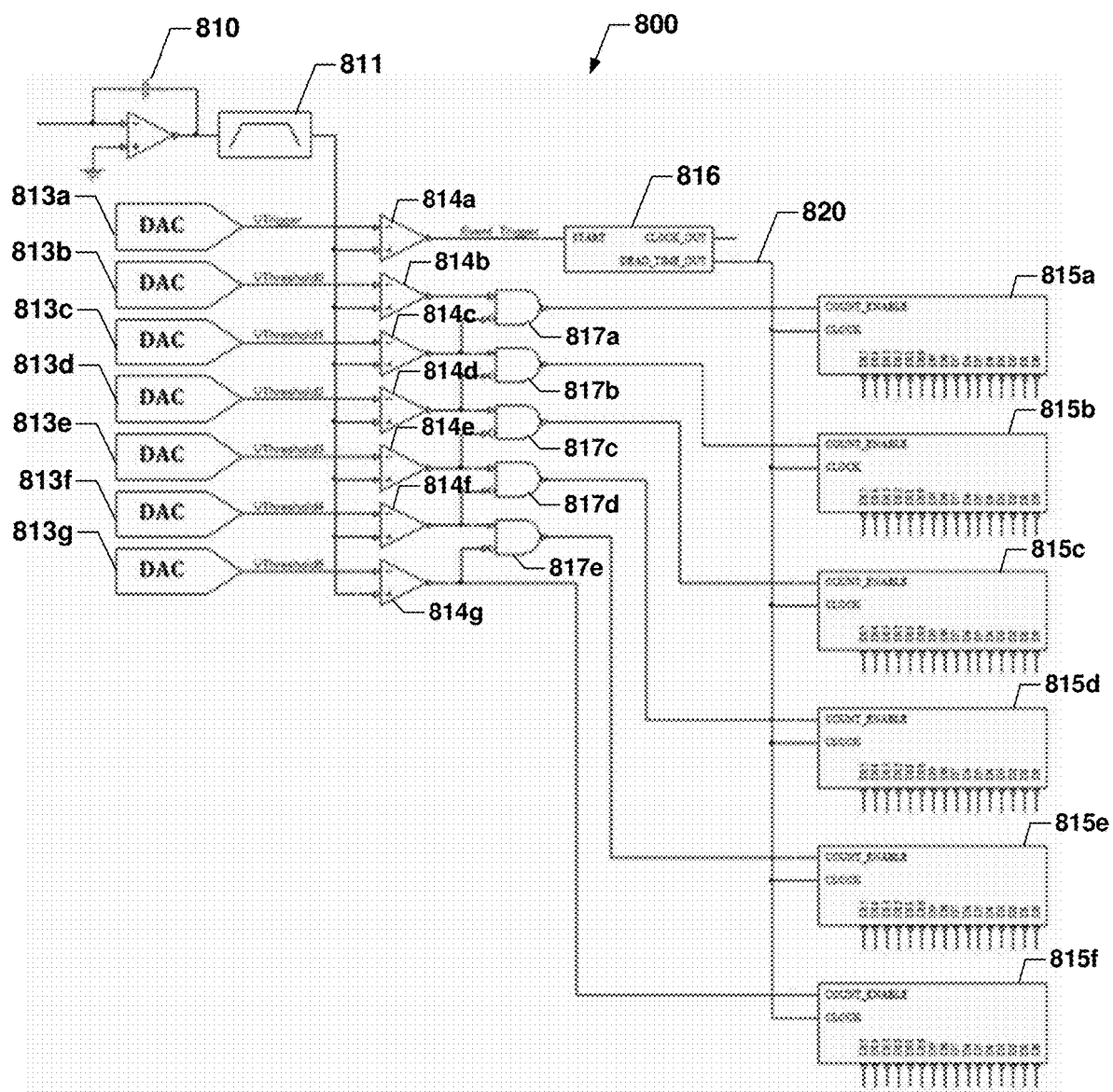
FIG. 8 is a circuit block diagram illustrating an embodiment of a circuit configured to determine temporal information regarding when discrete energy bin thresholds are crossed in the detector output signal from an X-ray detection event.

FIG. 8 illustrates an example of conventional radiation detector circuitry 800 for counting photons in particular photon energy bins. As used herein, the terms "energy bin" and "bin" refer to a particular range of measured photon energies between a minimum energy threshold and a maximum energy threshold. For example, a first bin may refer to counts of photons determined to have an energy greater than a threshold energy (referred to as a trigger threshold) and less than 20 keV, while a second bin may refer to counts of photons determined to have an energy greater than 20 keV and less than 40 keV, and so forth.

As described with reference to FIGS. 2-3C, an X-ray photon interacting (e.g., via the photoelectric effect) with a pixelated radiation detector material generates an electron cloud 224 within the material that is swept by an electric field to an anode electrode 206. The charge gathered on the anode is integrated by a charge sensitive amplifier (CSA) 810, with an individual amplifier and following circuit and logic for each pixel detector 202a, 202b within the pixelated X-ray detector. The voltage of the CSA output signal may be proportional to the energy of the X-ray photon. The output signal of the CSA may be processed by an analog filter 811.

The filtered output may be connected to the inputs of a number of analog comparators 814a-814g, with each comparator associated with a range of X-ray energies, referred to as an energy bin. The other input of each of the comparators 814a-814g is connected to a digital-to-analog converter (DAC) 813a-813g. The value of each DAC 813a-813g may be set by the user so that the DAC output voltage corresponds to the threshold level defining the limits of an energy bin. The detector circuitry 800 may be configured so that after the CSA voltage has stabilized (after the dead time), that voltage may be between two voltage thresholds set by two DACs (e.g., 813b and 813c), which determines the output of the comparators such that the comparator (e.g., 814b) receiving a voltage input from the lower voltage DAC (e.g., 813b) will be active (e.g., outputting a high voltage) while the comparator (e.g., 814c) receiving a voltage input from the next highest DAC (e.g., 813c) will not be active (e.g., outputting a high voltage).

The lowest level DAC 813a may be used to set the voltage value above which the circuitry treats the CSA output signal as associated with an X-ray photon detection, which is referred to herein as the trigger threshold. The lowest level comparator 814a connected to the lowest level DAC 813a will initiate an event trigger when the CSA output signal voltage equals or exceeds the DAC 813a output voltage, i.e., when the trigger threshold is crossed. The event trigger starts a timer 816 with a total period referred to as the dead-time, which is approximately the time required for the CSA output signal to stabilize following absorption of an X-ray photon in the associated detector pixel.

Each of the higher level DACs 813b-813g may be used to set the minimum voltage for each of the subsequent energy bins, providing their respective threshold voltage to corresponding comparators 814b-814g. When the CSA output signal voltage equals or exceeds a DAC 813b-813g output voltage, the corresponding comparator 814b-814g goes active and emits a signal (e.g., outputting a high voltage) that is provided as an input to a corresponding decision gate 817a-817e. Each decision gate 817a-817e receives an input from a lower voltage comparator (e.g., 814b) and the next higher voltage comparator (e.g., 814c), and emits a signal while the lower voltage comparator or is active (e.g., outputting a high voltage) but ceases the signal (e.g., outputting a zero or low voltage) when the next higher voltage comparator or goes active (e.g., outputting a high voltage). For example, when the CSA output signal voltage equals or exceeds the DAC 813b output voltage, the corresponding comparator 814b goes active and provides a signal (e.g., outputting a high voltage) to the corresponding decision gate 817a, which emits a signal until the CSA output signal voltage equals or exceeds the DAC 813c output voltage and the corresponding comparator 814c goes active (e.g., outputting a high voltage), at which point the threshold voltage of DAC 813d will have been crossed so comparator 814d will go active (e.g., outputting a high voltage) and decision gate 817b will emit a signal (e.g., outputting a high voltage).

A counter 815a-815f may be associated with each comparator 817b-817f (other than the trigger comparator 814a) and receive a signal from a corresponding decision gate 817a-8a7e. The counters 815a-815f may be used for counting the number of photons with energies within each energy bin's minimum and maximum thresholds. After the dead time, the timer 816 emits a clock signal 820 to the counters 815a-815f, and to the CSA integrator 811, which resets the CSA. The counter 815a-815f that is receiving a signal from a decision gate 817a-8a7e when the clock signal 820 is incremented. Thus, in the configuration of the circuitry 800, each counter is associated with one of the energy bins, and only the counter associated with the energy bin of the impinging photon records an X-ray photon count. After a period of time referred to as a view or frame, the counters are read out and then reset, allowing a new sequence of counting to commence.

Figure 9:
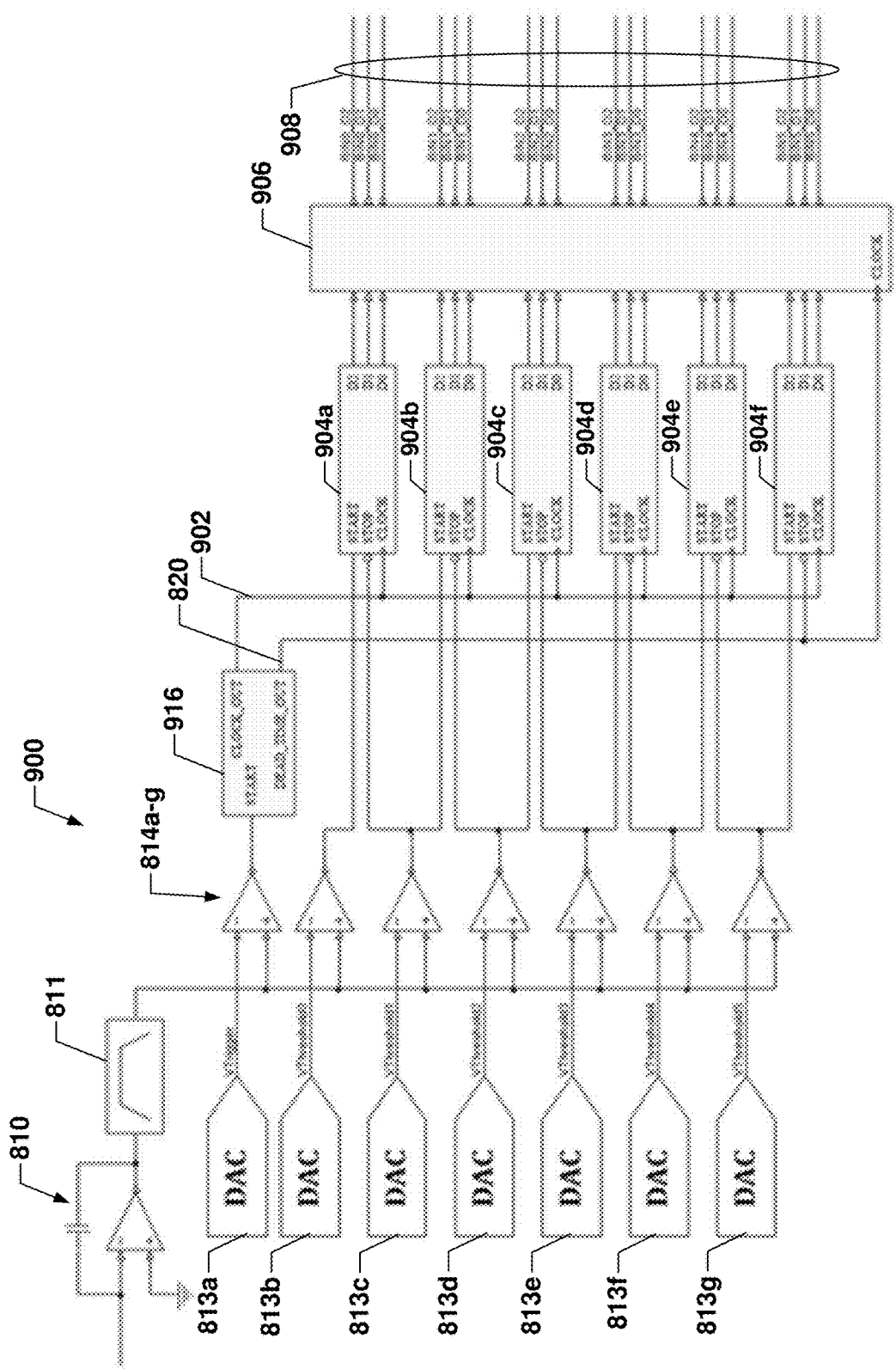
FIG. 9 is a circuit block diagram illustrating another embodiment of a circuit configured to determine temporal information regarding when discrete energy bin thresholds are crossed in the detector output signal from an X-ray detection event.

FIG. 9 is an example embodiment of circuitry 900 for obtaining temporal-spectral information regarding photon energies. In the embodiment illustrated in FIG. 9, the CSA 810, filter 811, DACs 813a-813g and comparators 814a-814g are the same as or similar to those used in typical conventional X-ray imaging detectors. However, in this embodiment, instead of the outputs of the comparators being directly used to trigger counters, a bank of threshold crossing recording circuits 904a-904f each associated with one energy bin record time information provided by a clock 916 in response to signals from the comparators 814a-814g. In this embodiment, the clock 916 that outputs the dead time signal 820 and a current time signal 902 that provides time interval information, and provides these two time signals to threshold crossing recording circuits 904a-904f associated with the different energy bins. As with the circuitry 800 described with reference to FIG. 8, when the trigger threshold is crossed, the timer 916 is started in response to a signal from the threshold comparator 814a. As the CSA output signal rises, comparators 814b-814g will go active (e.g., outputting a high voltage) when the CSA output signal exceeds the threshold voltage output by the corresponding DAC 813b-813g, and in response the corresponding threshold crossing recording circuit 904a-904f will record the current value of the timer signal 902. Thus, the operations of the circuit 900 results in time information in the time signal 902 being recorded when each of N energy bin thresholds is crossed. As a result, after the CSA output signal output has stabilized, such as in response to the dead time signal 820 from the clock 816, there will be up to N values representing the time from the event trigger until each energy bin threshold was crossed. Equivalently, the circuitry 900 (e.g., the configurations of the threshold crossing recording circuit 904a-904f may be configured to record the duration during which the CSA output signal was between the n'th and n+1'th energy bin threshold.

The threshold crossing recording circuits 904a-904f may be simple memory registers configured to record information in the time signal 902 in response to a receipt of a signal from a corresponding comparator 814b-814g. The time signal 902 may be in any of a variety of data formats, including time in absolute units (e. g., milliseconds), time in arbitrary units (e.g., increments every few milliseconds), or fixed units based on fractions of the dead time. As an example of fixed time units, the time signal 902 issued by the timer 916 may be a number from 1 to 8 (or 0 to 7) that is incremented by the timer every ⅛'th of the dead time. Such fixed unit time signal may be in the form of three bits ranging from 000 to 111. In such an embodiment, the threshold crossing recording circuits 904a-904f may be three-bit registers that lock the current time signal 902 in response to a signal from a corresponding comparator 814b-814g. In this example, with six threshold crossing recording circuits 904a-904f connected to corresponding comparators 814b-814g as illustrated in FIG. 9, the circuit 900 will generate temporal-spectral data for each photon detection in the form of three-bit time information values for each of six energy bins.

In an embodiment, an incoming-pattern register 906 (e.g., a latch, multiplexor, or similar circuit) may obtain the bin threshold crossing time information from all threshold crossing recording circuits 904a-904f in response to receipt of the dead time clock signal 820. The incoming-pattern register 906 may temporarily store the bin threshold crossing time information, reformat the time information, and/or provide an output 908 of the temporal-spectral data for analysis by subsequent circuitry (see e.g., FIGS. 10 and 11) to determine the energy of the X-ray photon, detect and account for pile up detections, account for charge sharing events, and other analyses.

In a further embodiment, instead of a bank of threshold crossing recording circuit 904a-904f recording time information provided by the clock 916, the outputs of the comparators may be used to incrementally trigger a bank of timers to directly determine the time between crossings of the minimum thresholds and the maximum thresholds. In this embodiment, a dead-time timer 816 starts to run when the trigger threshold is crossed. The internal clock of the dead-time timer is used for clocking a number of pattern timers, with each pattern timer associated with a threshold comparator. When the n'th threshold is crossed, a signal from the n'th comparator causes the n'th pattern timer to start incrementing. When the n+1'th threshold is crossed, the signal from the n'th comparator stops, which causes the n'th pattern timer to stop incrementing. Thus, each pattern timer determines the duration during which the CSA voltage was between the n'th and n+1'th voltage levels of a corresponding energy bin. The outputs of the pattern timers may then be sampled by an incoming-pattern register 906 at the end of the dead time. All pattern timers may then be reset at the end of the dead time to be ready for the next photon.

It will be appreciated that the number of DACs 813a-813g, comparators 814a-814g, threshold crossing recording circuits 904a-904f, as well as the number of energy bins referred to in descriptions of various embodiments are for illustration purposes, and more or fewer of such components and energy bins may be used without departing from concepts of the various embodiments or the scope of the claims.

In some embodiments, the temporal-spectral information output by embodiment circuits (e.g., 900) may be used as a spectral time-based histogram. For example, as discussed above regarding the CSA output signals from 50 keV, 70 keV and 110 keV photon detections in a detector with six energy bin thresholds at 20, 40, 60, 80, 100 and 120 keV described with reference to FIG. 4, the circuit 900 may output spectral time-based histograms of [1, 7, -, -, -, -] for a 50 keV photon detection, [0, 2, 6, -, -, -] for a 50 keV photon detection, and [0, 0, 1, 2, 5, -] for a 110 keV photon detection.

To estimate the energy of a detected photon based on the temporal-spectral information, the digital pattern from each photon event may be compared to a set of calibrated comparison patterns, with each comparison pattern mapped to an energy range or bin. Together the comparison patterns will cover the entire range of expected energies of incident photons. When a comparison circuit or processor-executed algorithm (e.g., a table look up algorithm) matches temporal-spectral pattern output from the detector to a calibrated comparison pattern (i.e., a match is found), a counter incremented for the energy range or bid associated with the matched pattern. After enough photons have been detected, the values in the counters are an estimated representation of the X-ray spectrum.

As a relatively small number of patterns are possible as a result of single-photon events, only a small number of comparisons are required to estimate the energy of the X-ray photon. This makes it possible to generate a high-resolution spectral time-based histogram of the spectrum with a small number of analog DACs 813a-813g and comparators 814a-814g and reasonably sized digital circuitry 900. As an example, in some embodiments a spectrum with 16 or 32 energy bins may be supported with only 6 thresholds.

In some embodiments, a bank of loadable pattern-matching registers may be provided, with the number of registers K greater than or equal to the expected number of patterns. In a typical embodiment, K=48 or 64 is sufficient. The values loaded into the registers are determined after calibration. For an M bit wide timer and N thresholds, the registers are N*M bits wide.

Figure 10:
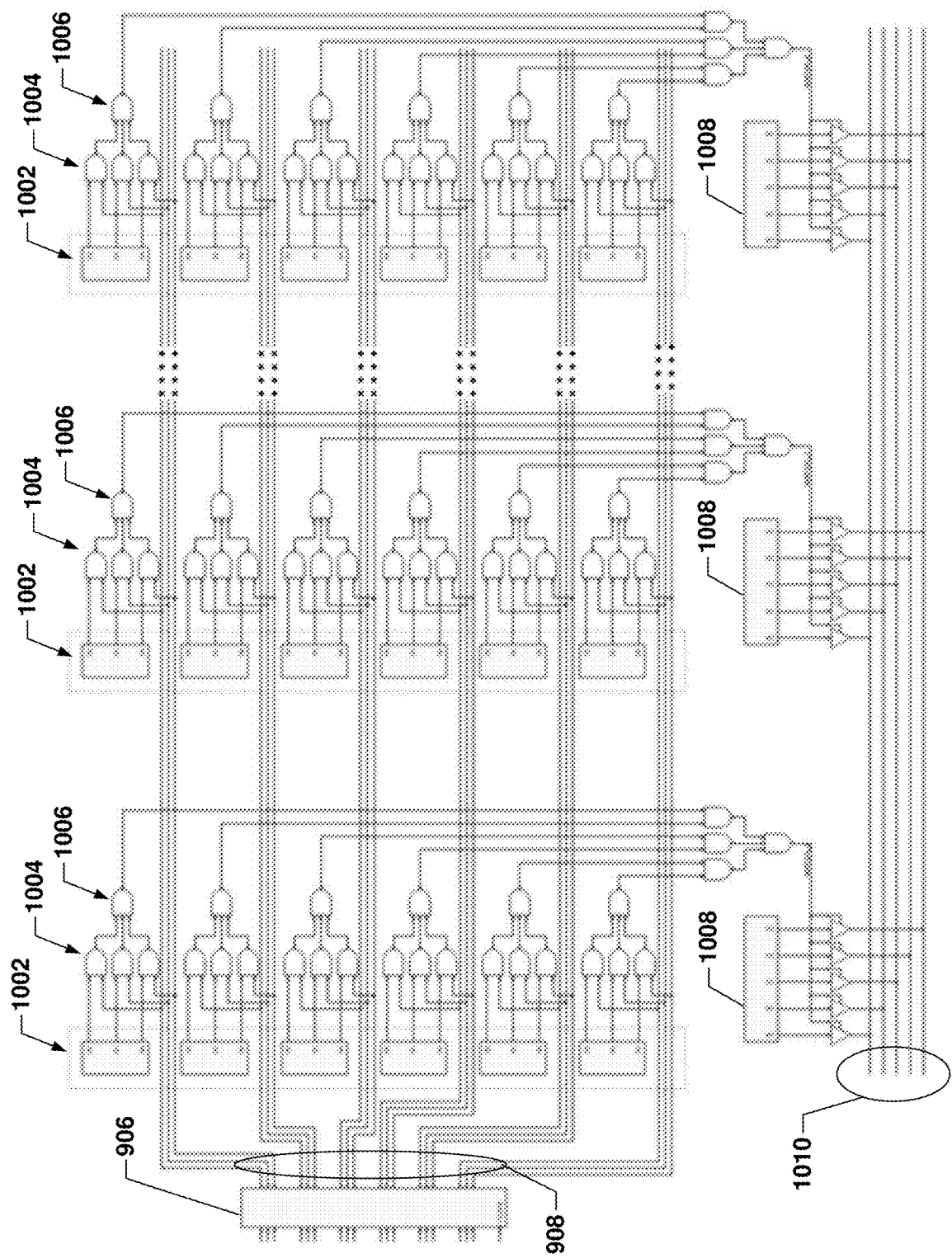
FIG. 10 is a circuit block diagram illustrating another embodiment of a circuit configured to determine temporal information regarding when discrete energy bin thresholds are crossed in the detector output signal from an X-ray detection event.

An embodiment of circuitry for performing the next phase of energy estimation based on the temporal-spectral information is shown in FIG. 10. The outputs of the incoming-pattern register 906 are compared with the values stored in a bank of pattern-matching registers 1002. Each of the pattern-matching registers may be loaded with user settable values derived from calibration, in which each value corresponds to a possible pattern which matches a range of photon energies. Following the example above, a register loaded with the value [1, 7, -, -, -, -] would match photons with energies around 50 keV and a register loaded with the value [0, 0, 1, 2, 5, -] would match photons with energies around 110 keV.

Each pattern-matching register 1002 may map to an energy bin in the time-based spectral histogram, with a user-loadable mapping register. A network of AND-gates 1004 may be used to match the patterns. If the final AND-gate 1004 of any register is active, tri-state buffers 1006 are enabled and the bin address stored in a mapping register 1008 on an address bus 1010.

Figure 11:
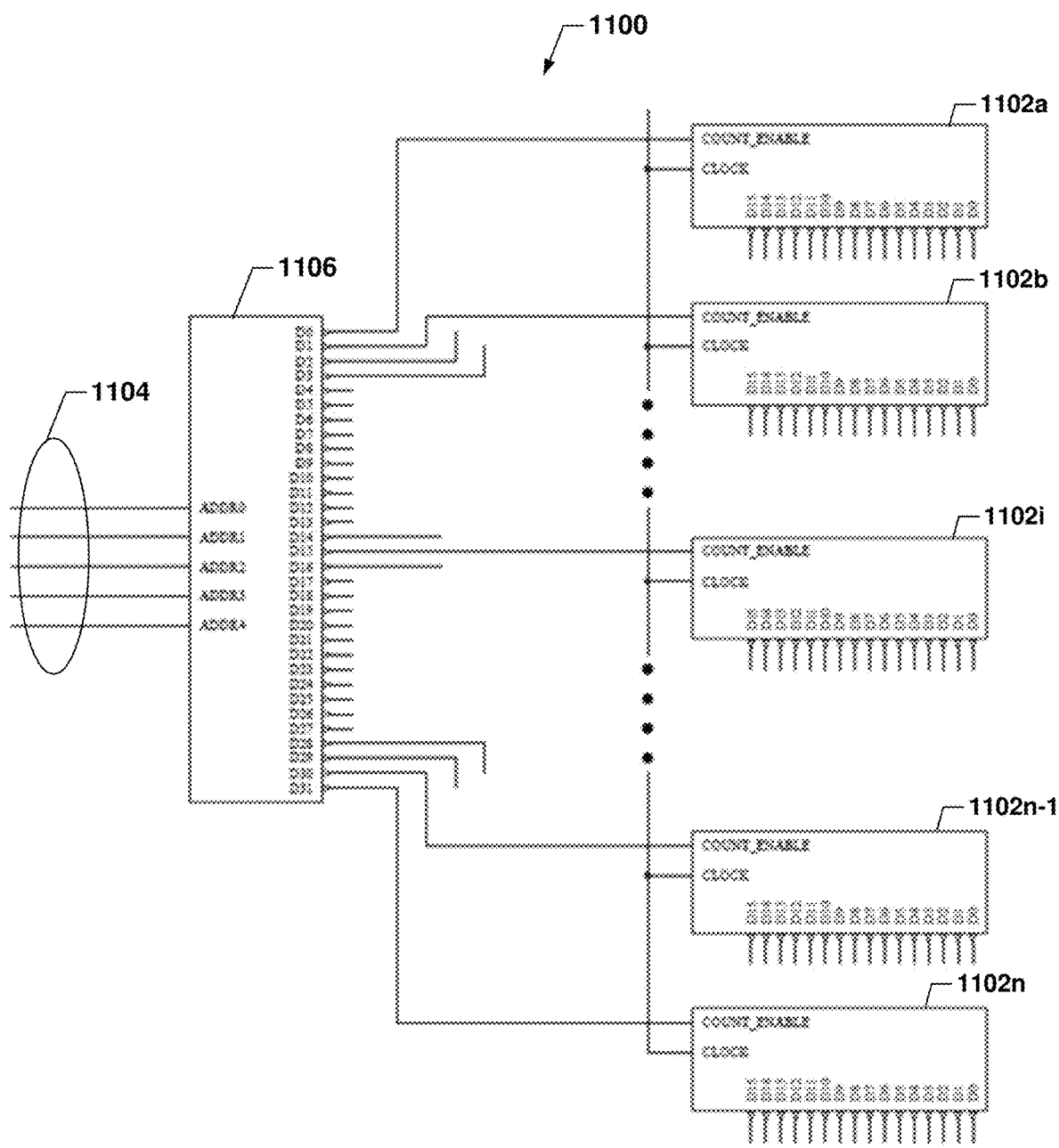
FIG. 11 is a circuit block diagram illustrating another embodiment of a circuit configured to determine temporal information regarding when discrete energy bin thresholds are crossed in the detector output signal from an X-ray detection event.

Another embodiment of circuitry 1100 for generating the spectral histogram is shown in FIG. 11. A bank of histogram counters 1102a-1102n is used to count the number of photons, with each counter corresponding to an energy bin in the spectral histogram. The value on the address bus 1104 is decoded by an address decoder 1106 where only a single output is active at any time. The single active output enables the counter corresponding to the value on the address bus, which is clocked and thus incremented when the circuit has stabilized. After a sufficient number of photons have been counted, the distribution of the accumulated values in the histogram counters will correspond to the distribution of photon energies in the incoming X-ray spectrum. The content of the counters may be then read out and the counters re-set to accumulate another view or frame.

The circuit-based embodiments illustrated in FIGS. 8-11 are only some of the possible circuit implementations for achieving the same result and a variety of algorithmically similar or equivalent circuit-based embodiments are possible. In some embodiments, the functionality accomplished by some of the circuit components illustrated in FIGS. 8-11 may be accomplished using a processor or other digital and/or analog circuitry executing processor-executable instructions implementing a method. This is particularly the case for processing temporal-spectral information to determine the energy of a detected photon, identify and account for pile up detection events, and identify and account for charge sharing events. FIGS. 12-15 illustrate some example embodiment methods for obtaining and processing of temporal-spectral information that may be accomplished in a processor, in dedicated hardware (e.g., illustrated in FIGS. 8-11), or in a combination of dedicated hardware and a processor.

Figure 12:
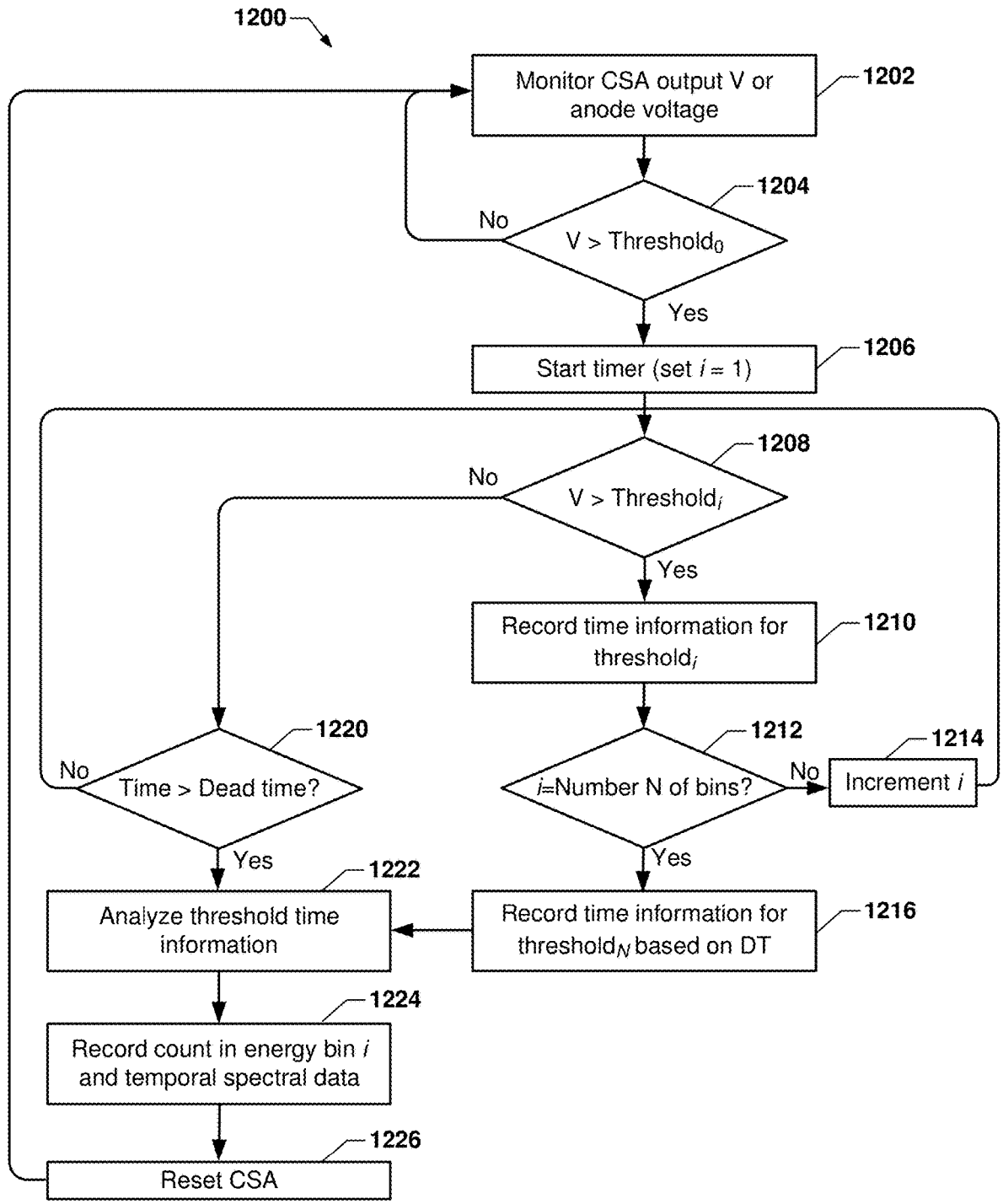
FIG. 12 is a process flow diagram illustrating a method of obtaining temporal-spectral information regarding an X-ray detection event in a pixel radiation detector according to various embodiments.

FIG. 12 illustrates an embodiment method 1200 for obtaining temporal-spectral information with a pixelated X-ray radiation detector comprising a plurality of detector pixels. The method 1200 may be implemented within a processor of an imaging X-ray detector (e.g., processor 107) or of an X-ray imaging system.

In block 1202, a processor or circuitry may monitor the CSA output voltage signal (or the anode voltage), and determine whether that voltage exceeds a trigger threshold (threshold$_0$) in determination block 1204. This monitoring may continue while the CSA output voltage (or anode voltage) remains below the trigger threshold (i.e., determination block 1204="No").

In response to detecting that the CSA output voltage (or anode voltage) equals or exceeds the trigger threshold (i.e., determination block 1204="Yes"), a timer may be started in block 1206. Also as part of this operation, an index i may be set to "1," although the use of an index in the method 1200 is for illustrative purposes, as the loop structure illustrated in FIG. 12 may be replaced by a sequence of equivalent operations.

In determination block 1208, a processor or circuitry may determine whether the CSA output voltage (or anode voltage) equals or exceeds a threshold corresponding to the index i. For example, in a first iteration, the determination made in block 1208 may be whether the CSA output voltage (or anode voltage) exceeds the minimum threshold for a first energy bin.

In response to determining that the CSA output voltage (or anode voltage) equals or exceeds the threshold corresponding to the index i (i.e., determination block 1208="Yes"), a processor or circuitry may record time information associated with the crossing of that threshold in block 1210. For example, in some embodiments this may involve storing information obtained from an internal clock in response to the determination. As another example, in some embodiments this may involve starting a in timer in response to the determination.

In determination block 1212, a processor or circuitry may determine whether the index i is equal to the total number N of energy bins in which photon energies are counted.

In response to determining that the index i is not equal to the total number N of energy bins, the index may be incremented and a processor or circuitry may reperform the operations in determination block 1208.

In response to determining that the CSA output voltage (or anode voltage) does not equal or exceed the threshold corresponding to the index i, a processor or circuitry may determine whether the time according to the timer exceeds the dead time (or that a dead time timer has expired) in determination block 1220. As described above, the dead time equals a predetermined amount of time sufficient to enable the CSA output voltage (or anode voltage) to stabilize.

In response to determining that the time according to the timer does not exceed the dead time (or that a dead time timer has not expired) (i.e., determination block 1220="No"), the index may be incremented and a processor or circuitry may reperform the operations in determination block 1208.

In response to determining that the index i is not equal to the total number N of energy bins, a processor or circuitry may record time information for the Nth threshold or energy bin based upon the remaining dead time or time before expiration of a dead time timer in block 1216. In other words, if the Nth threshold has been crossed, and thus an X-ray photon will be counted in the Nth energy bin, the time information to be recorded associated with the Nth energy bin may be the amount of time left before the dead time timer expires.

In response to determining that the time according to the timer equals or exceeds the dead time (or that a dead time timer has expired) (i.e., determination block 1220="Yes") or after recording time information in block 1216, a processor or circuitry may analyze the threshold time information in block 1222. Such analysis may include determining the energy of the detected photon based upon the obtained temporal-spectral information obtained in the method 1200 using one or more of the embodiments described herein. Such analysis may also include detecting an accounting for pileup detection events and charge sharing events as described herein.

In block 1224, a processor or circuitry may record an X-ray photon count in the energy bin associated with the index i along with associated temporal-spectral data, and reset the CSA in block 1226 before returning to monitoring the CSA output voltage (or anode voltage) for another event trigger in blocks 1202 and 1204.

Figure 13:
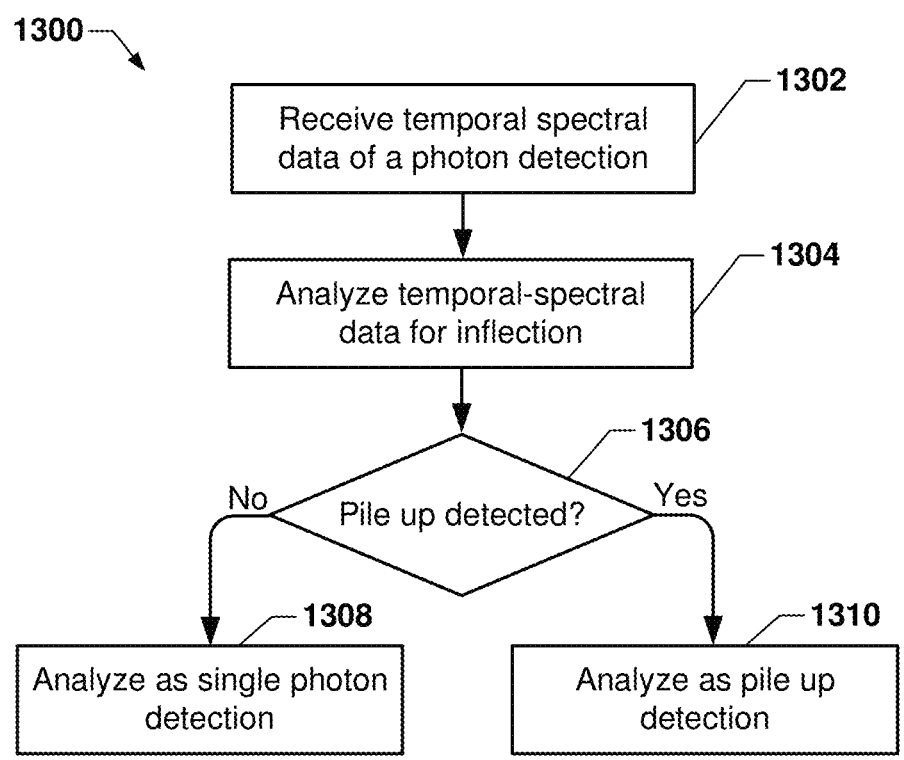
FIG. 13 is a process flow diagram illustrating a method of detecting multiple photon detection ("pile up") events based on temporal spectral information from a pixel radiation detector according to some embodiments.

FIG. 13 illustrates a method 1300 for using temporal spectral data of the X-ray photon count to distinguish between a single photon detection and a pileup detection event. In some embodiments, the operations of the method 1300 may be performed as part of or replacement for operations in block 1222 of the method 1200. The operations of the method 13 may be performed by a processor executing and algorithm implementing the method, by dedicated circuitry, or by a combination of a processor and dedicated circuitry.

In block 1302, a processor or circuitry may receive temporal spectral data of the X-ray photon count, such as obtained via the method 1200 as described with reference to FIG. 12.

In block 1304, a processor or circuitry may analyze the temporal spectral data for an inflection point. As described above, such analysis may involve comparing or subtracting incremental time values in a time-based spectral histogram to determine whether the duration in a lower energy bin exceeds the duration in a higher energy bin.

In determination block 1306, a processor or circuitry may determine whether a pileup detection event has occurred based upon the analysis performed in 1304.

In response to determining that a pileup detection events has not occurred, a processor or circuitry may analyze the temple-spectral data as a single photon detection event, such as to determine the energy or energy bin of the detected photon as described herein.

In response to determining that a pileup detection events has occurred, a processor or circuitry may analyze the temple-spectral data as a pileup detection event, such as to account for multiple photon interactions as described herein.

Figure 14A:
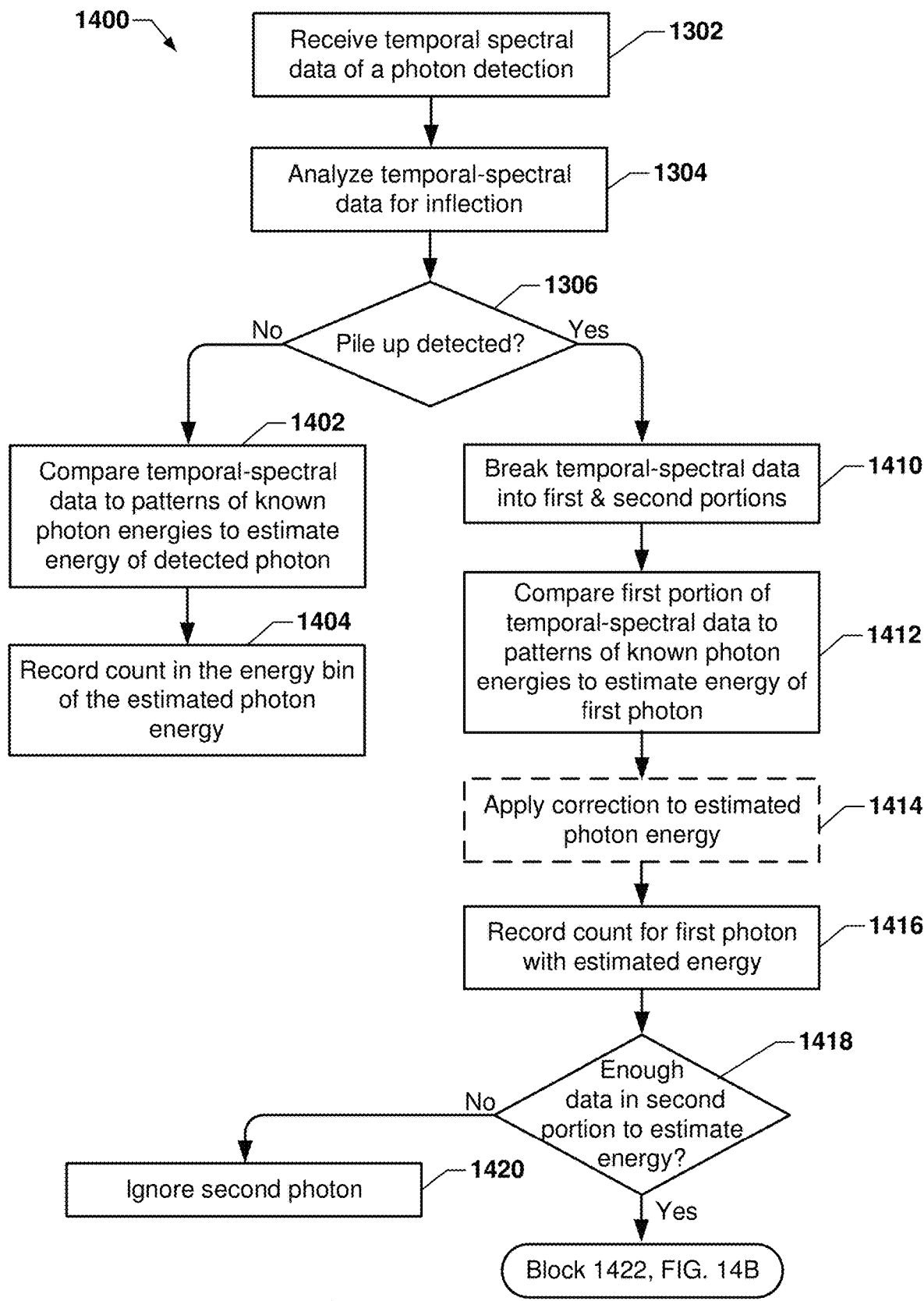
FIGS. 14A and 14B are a process flow diagram illustrating a method of estimating the energies of photons interacting with a pixel detector in single photon events and pile up events based upon temporal spectral information from the pixel radiation detector according to some embodiments.

FIG. 14 illustrates a method 1400 for using temporal spectral data of the X-ray photon count to estimate the energy of a single photon detection and to properly account for a pileup detection event. In some embodiments, the operations of the method 1400 may be performed as part of or replacement for operations in block 1222 of the method 1200. The operations of the method 1400 may be performed by a processor executing and algorithm implementing the method, by dedicated circuitry, or by a combination of a processor and dedicated circuitry.

In blocks 1302 through 1306, a processor or circuitry may receive and analyze temporal-spectral data of the X-ray photon count to determine whether a pileup detection events has occurred as described for the like numbered blocks of the method 1300.

In response to determining that a pileup detection event has not occurred (i.e., determination block 1306="No"), a processor or circuitry may compare the temporal-spectral data to patterns of known photon energies to estimate the energy of the detected photon. As described above, this may involve comparing the temporal-spectral data pattern to patterns determine from calibration testing of the detector using photons of known energies. In some embodiments, this comparison may be made through dedicated circuitry such as illustrated in FIG. 10. In some embodiments this comparison may be made by a processor comparing a time-based spectral histogram of the temple-spectral data to patterns stored in memory, such as through a table lookup process, sequential binary search process, a pruned tree search process, or other algorithm for matching a string of data to stored patterns of data.

In block 1404, a processor or circuitry may record a count in the energy bin corresponding to the X-ray photon energy determined in block 1402.

In response to determining that a pileup detection event has not occurred (i.e., determination block 1306="No"), a processor or circuitry may break the temporal-spectral data into two portions delineated by the inflection point determined in block 1304, such as a first portion and the second portion.

In block 1412, a processor or circuitry may compare the first portion of the temporal-spectral data to patterns of known photon energies to estimate the energy of the detected photon. As in block 1402, this may involve comparing the temporal-spectral data pattern to patterns determine from calibration testing of the detector using photons of known energies. In some embodiments, this comparison may be made through dedicated circuitry such as illustrated in FIG. 10. In some embodiments this comparison may be made by a processor comparing a time-based spectral histogram of the temple-spectral data to patterns stored in memory, such as through a table lookup process, sequential binary search process, a pruned tree search process, or other algorithm for matching a string of data to stored patterns of data. This comparison may be similar to that performed in block 1402 except that the amount of temporal-spectral data is limited by the time at which the second photon interacted with detector as indicated by the inflection point.

In optional block 1414, a processor or circuitry may apply a correction to the X-ray photon energy estimated in block 1412 to account for the fact that the determination was based upon a less than the full amount of time allotted by the dead time.

In block 1416, a processor or circuitry may record a count for the first photon in the energy bin associated with the X-ray photon energy estimated in blocks 1412 and 1414.

In determination block 1418, a processor or circuitry may determine whether there is sufficient data in the second portion of the time-spectral data to estimate the energy of the second photon. For example, if only one or two time units remained in the dead time following the inflection, there may be insufficient information to accurately match the temporal-spectral data of the second photon two known patterns of photon energies.

In response to determining that there is insufficient information to estimate the energy of the second photon (i.e., determination block 1418="No"), the processor or circuitry may ignore the second photon in block 1420. In other words, no count may be registered for the second photon, and thus the pile up detection event may result in recording a single count even though two photons interacted with the detector during the dead time.

Figure 14B:
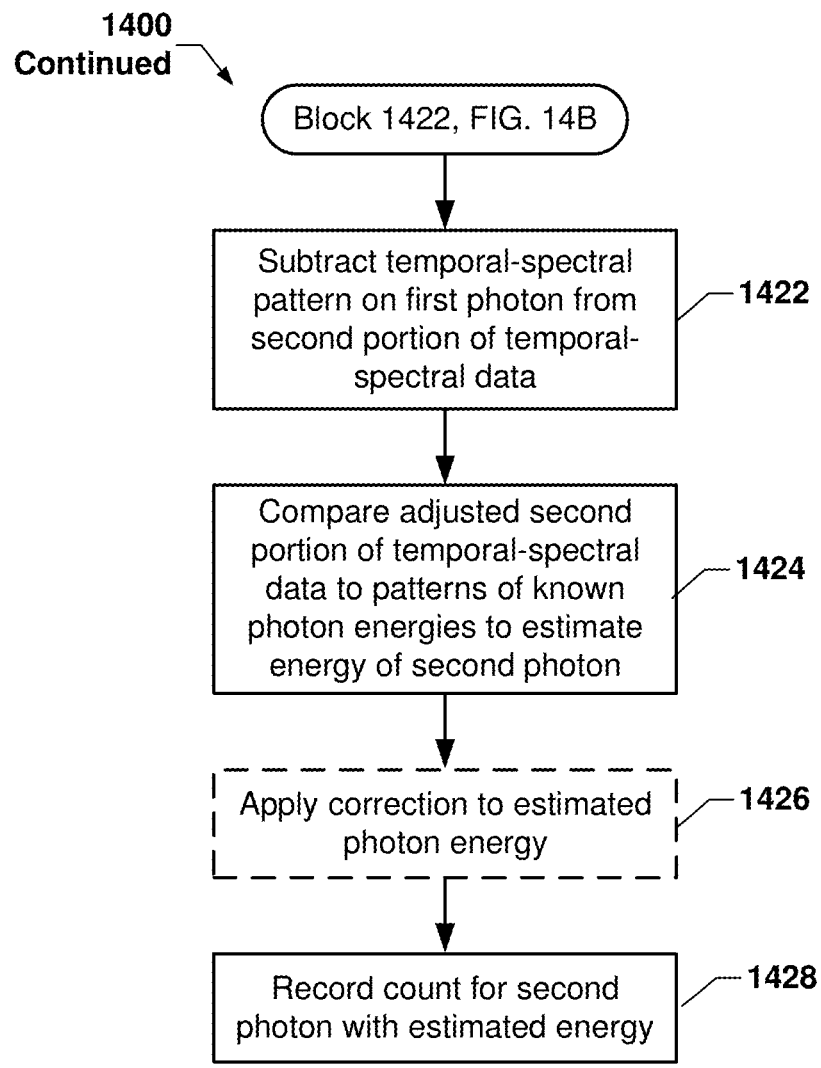

Referring to FIG. 14B, in response to determining that there is sufficient information in the second portion of the temporal-spectral data to estimate the second photon's energy (i.e., determination block 1418="Yes"), a processor or circuitry may subtract the temporal-spectral pattern of the first photon from the second portion of the temporal-spectral data to obtain corrected second portion of the temporal-spectral data, which is an estimate of the temple-spectral data for the second photon in block 1422. In some embodiments, this may involve determining what the complete temple-spectral pattern of the first photon was based on a known temple-spectral pattern of an X-ray photon of the same energy determined from calibration of the detector and stored in memory.

In block 1424, a processor or circuitry may compare the corrected second portion of the temporal-spectral data to patterns of known photon energies to estimate the energy of the detected photon. As in block 1402 and 1412, this may involve comparing the corrected second portion of temporal-spectral data pattern to patterns determine from calibration testing of the detector using photons of known energies. This comparison may be similar to that performed in block 1402 and 1412 except that the amount of temporal-spectral data is limited by the time remaining in the dead time when the second photon interacted with detector as indicated by the inflection point.

In optional block 1426, a processor or circuitry may apply a correction to the X-ray photon energy estimated in block 1424 to account for the fact that the determination was based upon a less than the full amount of time allotted by the dead time.

In block 1428, a processor or circuitry may record a count for the second photon in the energy bin associated with the X-ray photon energy estimated in blocks 1424 and 1426.

Figure 15:
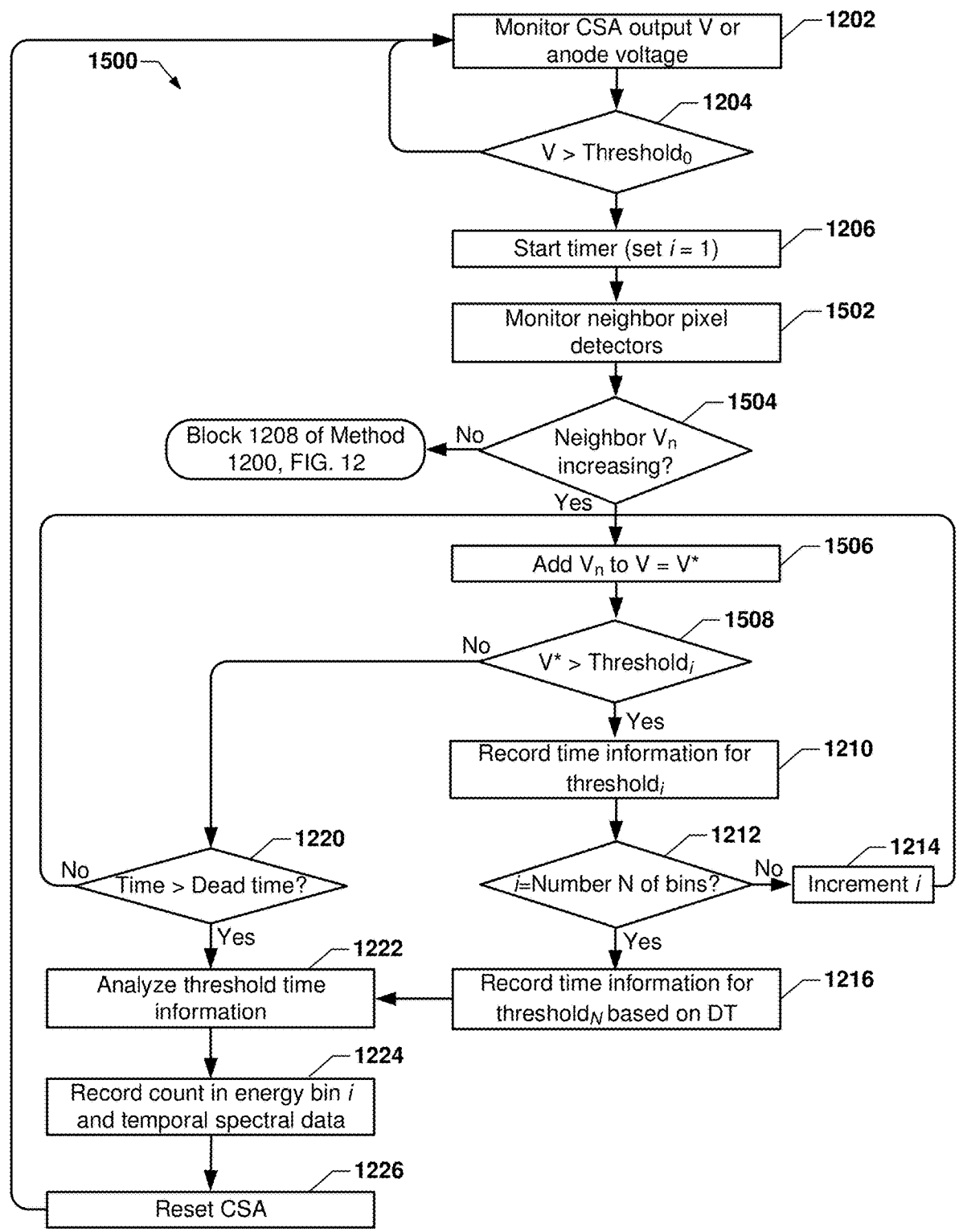
FIG. 15 is a process flow diagram illustrating a method of estimating the energy of an X-ray photon detected in an inter-pixel charge sharing detection event in based upon temporal spectral information from the pixel radiation detector according to some embodiments.

FIG. 15 illustrates a method 1500 for recognizing an accounting for charge sharing events according to some embodiments. In some embodiments, the operations of the method 1400 may be performed as part of or replacement for operations in block 1222 of the method 1200. The operations of the method 1500 may be performed by a processor executing and algorithm implementing the method, by dedicated circuitry, or by a combination of a processor and dedicated circuitry.

A processor or circuitry may perform the operations of blocks 1202 through 1206 of the method 1200 as described with reference to FIG. 12.

In block 1502, a processor or circuitry may also monitor the CSA output voltage (or anode voltage) neighboring pixel detectors (i.e., pixel detectors adjacent to the pixel detector in which the CSA output voltage (or anode voltage) as exceeded the trigger threshold).

In determination block 1504, a processor or circuitry may determine whether any of the neighboring pixel detectors are exhibiting an increase in the CSA output voltage or anode voltage ("$V_n$" in FIG. 15). This determination may include determining whether any increase exceeds a minimum threshold, which may be less than the trigger threshold as the purpose for this determination is to detect whether charge sharing is occurring.

In response to determining that none of the neighboring pixel detectors are exhibiting an increase in the CSA output voltage or anode voltage (i.e., determination block 1504="No"), this may indicate that charge sharing is not occurring and a processor or circuitry may perform the operations of the method 1200 beginning in block 1208 as described with reference to FIG. 12.

In response to determining that one of the neighboring pixel detectors is exhibiting an increase in the CSA output voltage or anode voltage (i.e., determination block 1504="Yes"), a processor or circuitry may add the neighboring pixel detector CSA output voltage or anode voltage $V_n$ to the triggered pixel CSA output voltage or anode voltage to obtain a corrected voltage (e.g., $V_n+V=V^*$) for use in analyzing the detected photon.

In determination block 1508, a processor or circuitry may determine whether the corrected voltage exceeds the threshold for the energy bin associated with index i. This operation will be similar to the determination made in block 1208 of the method 1200 described with reference to FIG. 12 with the exception that the comparison is made using the corrected voltage determined in block 1506.

In response to determining that the corrected voltage does not exceed the threshold for the energy bin associated with index i (i.e., determination block 1508="No"), a processor or circuitry may perform the operations in blocks 1220 through 1226 of the method 1200 described with reference to FIG. 12 with the exception that in response to determining that the dead time timer has not expired (i.e., determination block 1220="No"), a processor or circuitry may again calculate a corrected voltage in block 1506 before again determining whether the corrected voltage exceeds the i'th threshold in determination block 1508.

In response to determining that the corrected voltage does exceeds the threshold for the energy bin associated with index i (i.e., determination block 1508="No"), a processor or circuitry may perform the operations in blocks 1210 through 1216 of the method 1200 described with reference to FIG. 12 with the exception that in response to determining that the index i is less than the number of energy bins (i.e., determination block 1212="No"), a processor or circuitry may again calculate a corrected voltage in block 1506 before again determining whether the corrected voltage exceeds the i'th threshold in determination block 1508.

Figure 16:
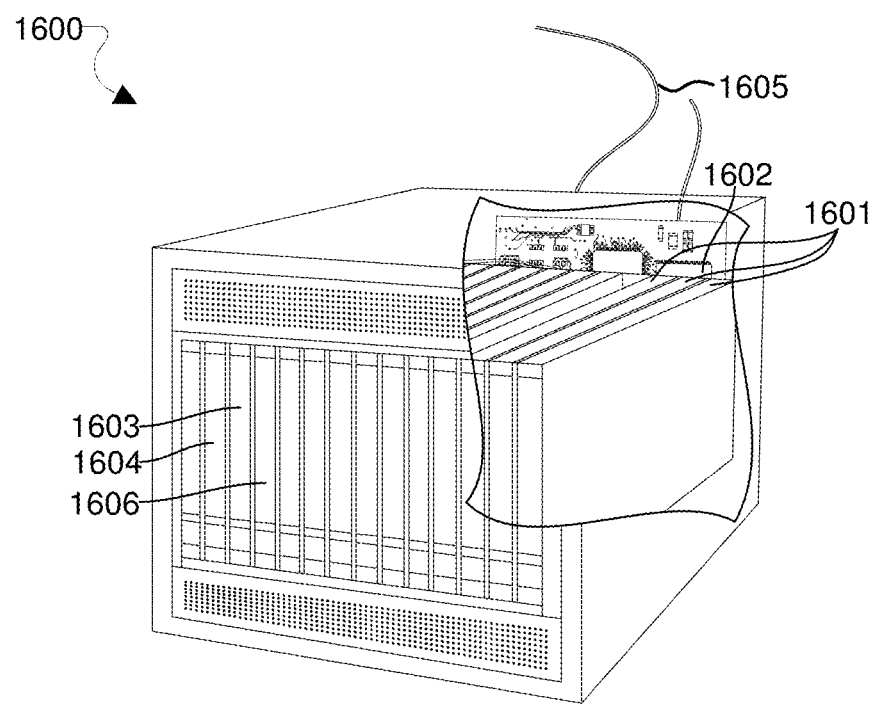
FIG. 16 is a component block diagram illustrating an example server suitable for use with the various embodiments.

The various embodiments (including, but not limited to, the embodiment methods described above with reference to FIGS. 12-15) may be implemented in computing systems, such as any of a variety of commercially available computers 1600 as illustrated in FIG. 16. Such a computer 1600 typically includes one or more processors 1601 coupled to volatile memory 1602 and a large capacity nonvolatile memory, such as a disk drive 1604. As illustrated in FIG. 16, one or more processors 1601 may be added to the computer 1600 by inserting them into the racks of the assembly. The computer 1600 may also include a floppy disc drive, compact disc (CD) or digital versatile disc (DVD) disc drive 1606 coupled to the one or more processors 1601. The computer 1600 may also include network access ports 1603 coupled to the one or more processors 1601 for establishing network interface connections with a network 1605, such as a local area network coupled to other computers and servers, or the Internet.

The present embodiments may be implemented in systems used for medical imaging, such as CT imaging, as well as for non-medical imaging applications, such as industrial inspection applications.

Computer program code or executable instructions for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Embodiments may be implemented as program code or processor-executable instructions stored on a non-transitory processor-readable storage medium that are configured to cause a processor coupled to a pixelated radiation detector, such as a processor or analysis unit of an X-ray imaging system, to perform operations of any of the various embodiments. Program code or processor-executable instructions stored on a non-transitory processor readable storage medium as used in this application may refer to machine language code (such as object code) whose format is understandable by a processor. Non-transitory processor-readable storage medium include any form of media used for storing program code or processor-executable instructions including, for example, RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor or computer.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

What is claimed is:

1. A method of processing and output from a pixel detector within an imaging X-ray detector of an X-ray photon detection event, comprising:
    obtaining time information related to when an indication of an X-ray photon's energy exceeds each of a plurality of energy thresholds; and
    using the time information and corresponding energy bins to determine temporal-spectral data for the X-ray photon detection event.

2. The method of claim 1, further comprising using the temporal-spectral data to determine an energy bin in which to record a count for the X-ray photon detection event.

3. The method of claim 2, wherein using the temporal-spectral data to determine an energy bin in which to record a count for the X-ray photon detection event comprises matching the temporal-spectral data to a temporal-spectral pattern of an X-ray photon detection of a known energy.

4. The method of claim 3, wherein the temporal-spectral pattern of an X-ray photon detection of a known energy is determined from recording temporal-spectral data during calibration of the detector using X-ray photons of known energies.

5. The method of claim 3, wherein matching the temporal-spectral data to a temporal-spectral pattern of an X-ray photon detection of a known energy is accomplished in a processor using one of a table lookup process, a sequential binary search process, or a pruned tree process.

6. The method of claim 3, wherein matching the temporal-spectral data to a temporal-spectral pattern of an X-ray photon detection of a known energy is accomplished in circuitry.

7. The method of claim 1, further comprising using the temporal-spectral data to determine whether a pile up even occurred in which more than one photon interacted with the pixel detector during a dead time.

8. The method of claim 7, further comprising:
    performing a step of using the temporal-spectral data to determine an energy bin in which to record a count for the X-ray photon detection event in response to determining that more than one photon did not interact with the pixel detector during the dead time; and
    accounting for the pile up event in response to determining that more than one photon interacted with the pixel detector during the dead time.

9. The method of claim 8, wherein accounting for the pile up event detection comprises:
    breaking the temporal-spectral data into two parts;
    using a first part of the temporal-spectral data to determine an energy bin in which to record a count for a first X-ray photon; and
    using a second part of the temporal-spectral data to determine an energy bin in which to record a count for a second X-ray photon.

10. The method of claim 9, further comprising determining whether sufficient information is available in the second part of the temporal-spectral data to determine the energy of the second X-ray photon, wherein using the second part of the temporal-spectral data to determine the energy bin in which to record a count for the second X-ray photon is performed in response to determining that sufficient information is available in the second part of the temporal-spectral data to determine the energy of the second X-ray photon.

11. The method of claim 1, further comprising:
    determining whether indications of photon energy in neighbor pixel detectors adjacent to the pixel detector are increasing in response to the indication in the pixel detector exceeding a trigger threshold;
    adding the indication of photon energy to the indication of photon energy of the pixel detector to obtain a corrected indication value; and
    using the corrected indication value in the step of using the time information and corresponding energy bins to determine temporal-spectral data for the X-ray photon detection event.

12. The method of claim 1, wherein the indication of photon energy is voltage output of a charge sensitive amplifier (CSA).

13. The method of claim 12, wherein obtaining time information related to when an indication of an X-ray photon's energy exceeds each of a plurality of energy thresholds comprises:
    comparing the voltage output of the CSA to a threshold voltage;
    obtaining time information in response to the voltage output of the CSA exceeding the threshold voltage; and
    recording the time information for an energy bin associated with the exceeded threshold voltage.

14. An imaging X-ray detector comprising a plurality of pixel detectors and means for performing functions of the method of claim 1.

15. Circuitry for use with an X-ray detector comprising a plurality of pixel detectors and means for performing functions of the method of claim 1.

16. An imaging X-ray detector, comprising:
    a plurality of pixel detectors each comprising an anode;
    a charge sensitive amplifier (CSA) coupled to each pixel detector anode and configured to sense voltage on the anode and output a voltage signal;
    a plurality of comparator circuits each having an input coupled to the CSA output and an input that receives a threshold voltage from one of a plurality of digital-toanalog converters (DAC) and outputs a signal in response to the CSA output equaling or exceeding the threshold voltage;

a clock configured to output time information; and a plurality of threshold crossing recording circuits each coupled to the clock output of time information and the output signal of two of the plurality of comparators, wherein each of the plurality of threshold crossing recording circuits is configured to determine time information while a first of the two comparator output signals is high and a second of the two comparator output signals is low.

17. The imaging X-ray detector of claim 16, further comprising a circuit configured to determine an energy bin in which to count an X-ray photon based on the time information determined by each of the plurality of threshold crossing recording circuits.

18. An imaging X-ray detector, comprising:

a plurality of pixel detectors each comprising an anode;

a charge sensitive amplifier (CSA) coupled to each pixel detector anode and configured to sense voltage on the anode and output a voltage signal;

a plurality of comparator circuits each having an input coupled to the CSA output and an input that receives a threshold voltage from one of a plurality of digital-to-analog converters (DAC) and outputs a signal in response to the CSA output equaling or exceeding the threshold voltage; and a plurality of timer circuits each coupled to the output signals of two of the plurality of comparators, wherein each of the plurality of timer circuits is configured to begin incrementing in response to a first of the two comparator output signals going high and stopping incrementing in response to a second of the two comparator output signals is low.

* * * * *